United States Patent [19]

Kurosaki et al.

[11] Patent Number: 5,617,456
[45] Date of Patent: Apr. 1, 1997

[54] FUEL ASSEMBLY AND NUCLEAR REACTOR

[75] Inventors: Hideki Kurosaki; Junjiro Nakajima, both of Hitachi; Hajime Umehara, Katsuta; Shozo Nakamura, Hitachiota; Satoshi Kanno; Koji Nishida, both of Hitachi; Yasunori Bessho, Mito; Masahisa Inagaki, Hitachi; Osamu Yokomizo, Toukai-mura; Yuichiro Yoshimoto, Hitachi, all of Japan

[73] Assignee: Hitachi, Ltd., Tokyo, Japan

[21] Appl. No.: 463,828

[22] Filed: Jun. 5, 1995

Related U.S. Application Data

[60] Division of Ser. No. 214,760, Mar. 18, 1994, which is a continuation-in-part of Ser. No. 974,834, Nov. 16, 1992, which is a continuation of Ser. No. 526,030, May 21, 1990, abandoned, which is a continuation of Ser. No. 163,758, Jan. 14, 1988, abandoned.

[51] Int. Cl.⁶ .................................................. G21C 21/00
[52] U.S. Cl. .................................................. 376/260
[58] Field of Search .................................. 376/260, 352, 376/443, 444, 364, 365

[56] References Cited

U.S. PATENT DOCUMENTS

| | | |
|---|---|---|
| 3,380,649 | 4/1968 | Roberts . |
| 3,528,885 | 9/1970 | Kumpf . |
| 3,574,058 | 4/1971 | Gumuchian . |
| 3,621,926 | 11/1971 | Townsend . |
| 4,098,742 | 5/1978 | Amard et al. . |
| 4,123,327 | 10/1978 | Sugisaki et al. . |
| 4,229,258 | 10/1980 | Takeda et al. . |
| 4,279,698 | 7/1981 | Doi et al. . |
| 4,285,769 | 8/1981 | Specker et al. . |
| 4,587,090 | 5/1986 | Mochida et al. . |
| 4,708,846 | 11/1987 | Patterson et al. . |
| 4,777,016 | 10/1988 | Yoshioka et al. . |
| 4,803,044 | 2/1989 | Patterson . |
| 5,023,047 | 6/1991 | Nishida et al. . |
| 5,251,246 | 10/1993 | Matzner et al. ................. 376/444 |

FOREIGN PATENT DOCUMENTS

| | | |
|---|---|---|
| 1383585 | 2/1964 | France . |
| 4326675 | 11/1968 | Japan . |
| 54-121389 | 9/1979 | Japan . |
| 5522118 | 2/1980 | Japan . |
| 57-11038 | 3/1982 | Japan . |
| 57-125390 | 8/1982 | Japan . |
| 57-125391 | 8/1982 | Japan . |
| 0125390 | 8/1982 | Japan . |
| 0125391 | 8/1982 | Japan . |
| 58-44237 | 10/1983 | Japan . |
| 0044237 | 10/1983 | Japan . |
| 0050498 | 12/1984 | Japan . |
| 0052999 | 12/1984 | Japan . |
| 0220686 | 12/1984 | Japan . |
| 59-220686 | 12/1984 | Japan . |
| 61-38589 | 2/1986 | Japan . |
| 1029796 | 2/1986 | Japan . |
| 3179293 | 8/1991 | Japan ..................... 376/444 |

*Primary Examiner*—Harvey E. Behreno
*Attorney, Agent, or Firm*—Antonelli, Terry, Stout & Kraus

[57] ABSTRACT

The lower end of each of a plurality of fuel rods is supported by a fuel supporting portion of a lower tie plate. The fuel supporting portion includes a plurality of second coolant paths for supplying a coolant from below the fuel supporting portion to a first coolant path defined above the fuel supporting portion and between the fuel rods. The total cross-sectional area of all the second coolant paths is smaller than the cross-sectional area of the first coolant path. A water rod disposed between the fuel rods each includes an ascending tube path having therein a coolant ascending path having a coolant inlet port opening to a region below the fuel supporting portion, for guiding upward the coolant supplied through the coolant inlet port, and a descending tube having therein a coolant descending path having a coolant delivery port opening to said first coolant path, for guiding downward the coolant guided by said coolant ascending path and discharging the coolant through the coolant delivery port to the first coolant path. The descending tube path is so disposed outside the ascending tube path as to define a gap, through which the coolant inside the first coolant path flows, between it and the ascending tube path.

1 Claim, 17 Drawing Sheets

FIG. 4
FIG. 5
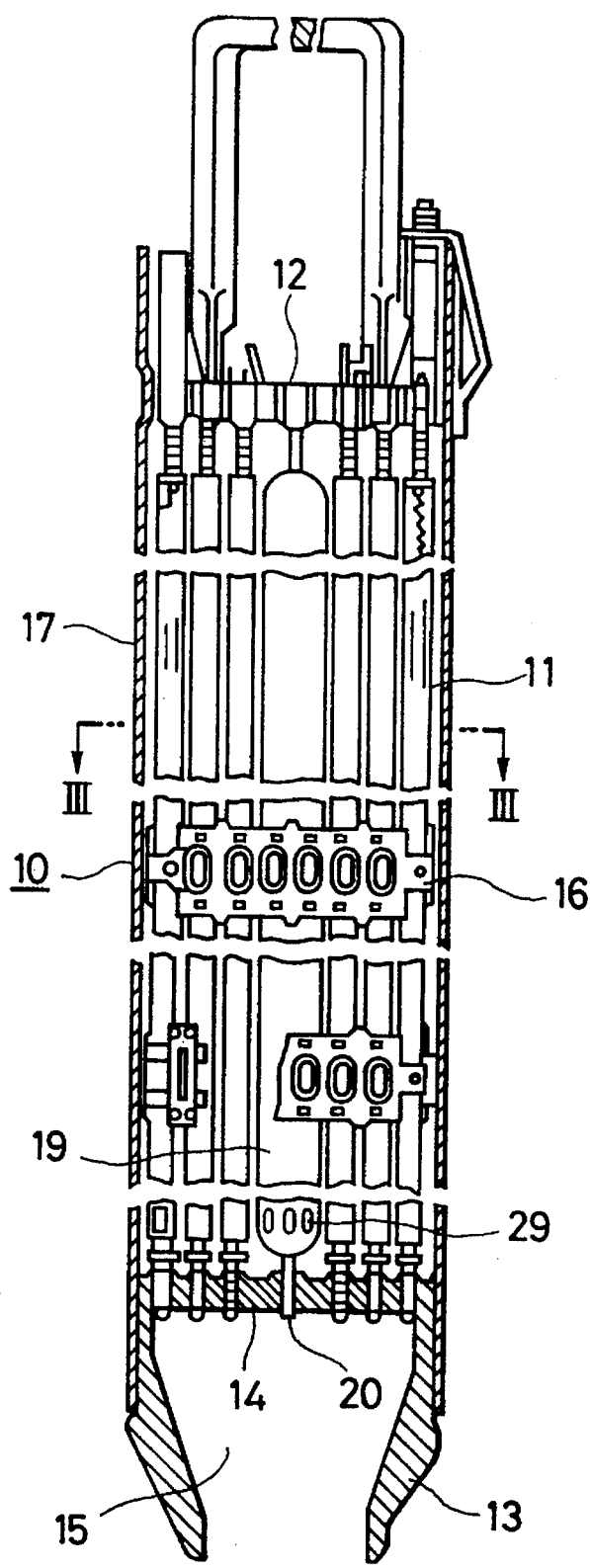
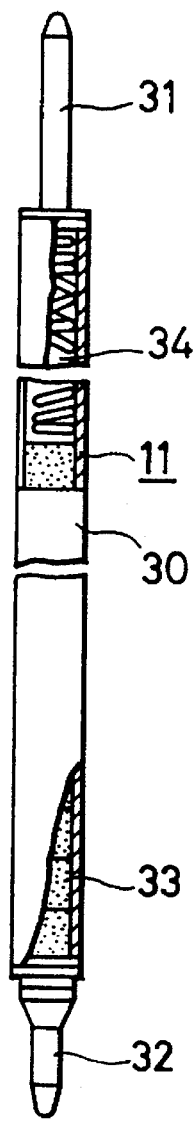

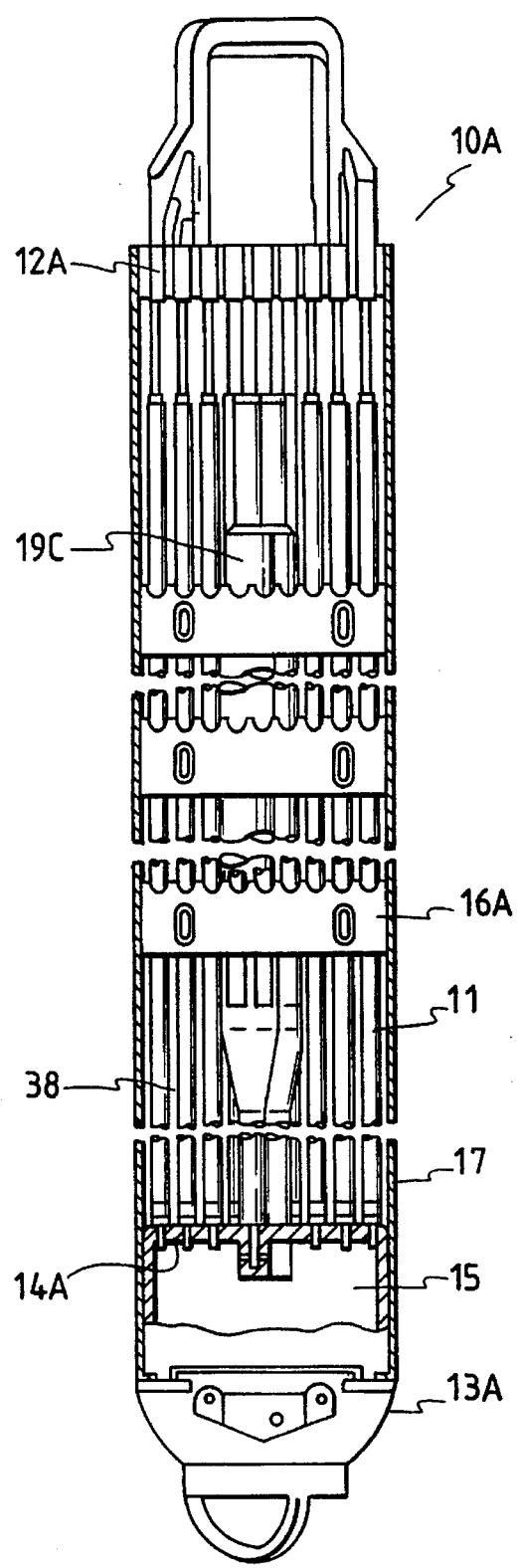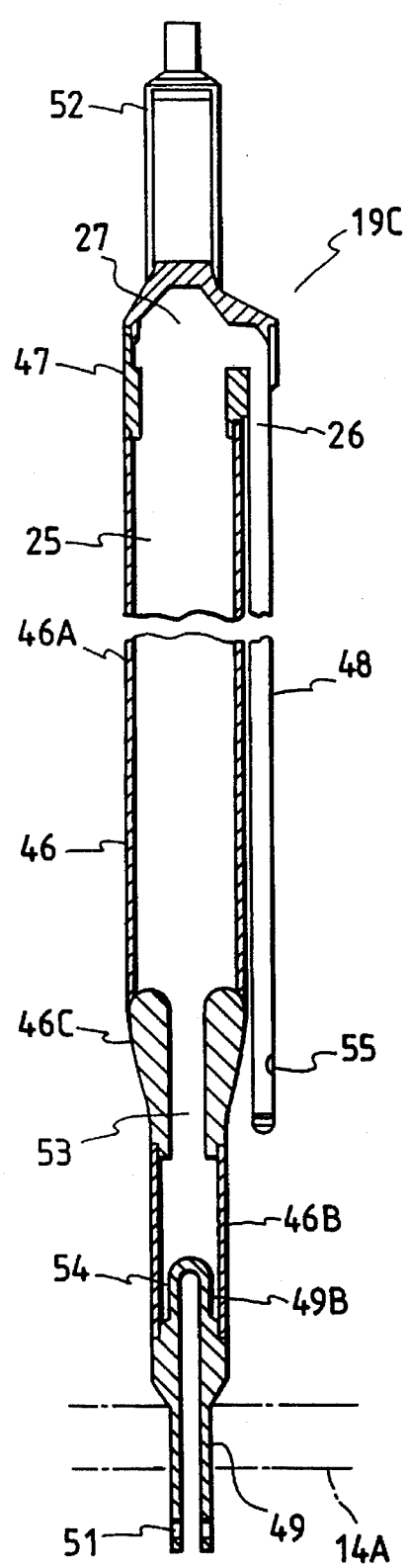
FIG. 21
FIG. 22

FUEL ASSEMBLY AND NUCLEAR REACTOR

CROSS-REFERENCE TO RELATED APPLICATIONS

This application is a Division of application Ser. No. 08/214,760, filed Mar. 18, 1994, which is a continuation-in-part of application Ser. No. 07/974,834, filed Nov. 16, 1992, which is a continuation of application Ser. No. 07/526,030, filed May 21, 1990, now abandoned, which is a continuation of application Ser. No. 163,758, filed Jan. 14, 1988, now abandoned. This invention is a continuation-in-part of application Ser. No. 07/974,834 filed Nov. 16, 1992, which is a continuation application of prior application Ser. No. 07/526,030 filed May 21, 1990, now abandoned, which is a continuation of application Ser. No. 163,758 filed Jan. 12, 1988, now abandoned, the subject matter of each of the aforementioned applications being incorporated by reference herein.

TECHNICAL FIELD

The present invention relates to a fuel assembly, and more particularly to a fuel assembly which can be used in a boiling-water reactor to save the consumption of nuclear fuel substances.

BACKGROUND ART

In a conventional boiling-water reactor as is disclosed in Japanese Patent Laid-Open No. 121389/1979, the reactor core is loaded with a fuel assembly which has a pipe (hereinafter referred to as water rod) in which the cooling water only flows to decelerate the neutrons. Under the operation conditions of the conventional boiling-water reactor, the water rod exhibits an increased reactivity with the increase in the number of hydrogen atoms for uranium atoms, enabling the nuclear fuel substances loaded in the reactor core to be effectively utilized.

In order to more effectively use the nuclear fuel substances, furthermore, it is recommended to change the number of hydrogen atoms in the reactor core as the nuclear fuel substances burn.

Japanese Patent Laid-Open Nos. 125390/1982 and 125391/1989 teach one of the methods. That is, according to these patent publications, provision is made of slow neutron-absorbing water purge rods and intermediate neutron-absorbing water purge rods constituted by a stainless steel which has a larger reactivity value than that of the above water purge rods, and the amount of the cooling water in the reactor core is adjusted by controlling the amount for inserting the water purge rods in the reactor core. The water purge rods serve as means for changing the number of hydrogen atoms in the reactor core. The amount of the cooling water in the reactor core decreases with the increase in the amount for inserting the water purge rods in the reactor core, and the amount of the cooling water increases in the reactor core with the decrease in the amount of insertion. According to the above-mentioned method, water purge rods of different kinds must be newly provided and must be operated by drive means, requiring complex structure and cumbersome operation.

Japanese Patent Laid-Open No. 38589/1986 discloses a fuel assembly which employs static means in order to solve the above-mentioned problems. According to this patent publication, the number of hydrogen atoms is changed by providing fuel rods having a low uranium 235 concentration in the water rod of fuel assembly, and by utilizing the change in the amount of voids in the water rod before and after uranium 235 of the fuel rods extinguishes.

There is a method of adjusting the amount of the cooling water that flows in the reactor core without the need of newly providing operation means such as water purge rods. That is, the cooling water is permitted to flow in small amounts in the reactor core during the start of the fuel cycle, and is then permitted to flow in increased amounts as the fuel cycle proceeds halfway.

Advantages will now be described in the case when the number of hydrogen atoms is changed in the reactor core accompanying the burn of the nuclear fuel substances.

In the case of a typical fuel assembly used for boiling-water reactors, a higher burning degree can be obtained when the operation is carried out at a high void fraction (void fraction, 50%) during the period of a burning degree of 0 to 30 GWD/T and when the operation is carried out at a decreased void fraction (void fraction, 30%) during the period of a burning degree of 30 to 40 GWD/T than when the operation is carried out at a constant void fraction (e.g., at a void fraction of 30%).

This is because, the neutrons have a high average speed and are easily absorbed by uranium 238 when the void fraction is high and the ratio of the number of hydrogen atoms to the number of uranium atoms is small, i.e., when the number of hydrogen atoms is small. The nuclear fuel substances used in the boiling-water reactor contains uranium 235 and uranium 238, uranium 235 occupying several per cent of the whole nuclear fuel substances and uranium 238 occupying most of the nuclear fuel substances. Among them, uranium 235 absorbs the neutrons and develops chiefly the nuclear fission, but uranium 238 develops nuclear fission very little. Therefore, the burn-up decreases if uranium 235 burns and decreases.

Uranium 238, however, is converted into plutonium 239 when it absorbs neutrons of a large energy produced by the nuclear fission. Like uranium 235, however, plutonium 239 absorbs decelerated thermal neutrons to develop nuclear fission. The higher the void friction, the larger the energy of the neutrons and uranium 238 is converted into plutonium 239 at an increased ratio, while suppressing the nuclear fission of uranium 235 and plutonium 239. Therefore, the higher the void fraction, the slower the rate of reduction of the total amount of uranium 235 and plutonium 239.

A high void fraction, however, causes the absolute value of reactivity to decrease. If the void fraction is maintained high, therefore, a minimum level is reached quickly at which the reactivity maintains the criticality compared with when the void fraction is low. Therefore, if the void fraction is lowered at that moment, the neutrons exhibit increased deceleration effect, whereby nuclear fission of uranium 235 and plutonium 239 increases, so that good reactivity is obtained compared with when the fuel substances are burned at a high void fraction that is maintained constant. This makes it possible to burn the core material contained in the nuclear fuel substances for an extended period of time before a minimum reactivity necessary for the criticality is reached.

In the foregoing was mentioned the principle which is called spectrum shift operation for effectively utilizing the nuclear fuel substances by changing the void fraction accompanying the burn of the core material.

Neither the method which provides static means in a simply constructed water rod nor the method which changes the number of hydrogen atoms in the reactor core by changing the amount of the cooling water (called reactor core flow rate) which flows through the reactor core, makes it possible to widely change the void fraction in the reactor core; i.e., these methods can only give small effect in the practical nuclear reactors.

That is, the lower limit of the flow rate in the reactor core is determined by the thermal limit, and the upper limit is determined by the capacity of the circulation pump and the flow-induced vibration. Under the condition where the boiling-water reactor is producing a rated thermal output, therefore, it is allowed to change the void fraction only within a narrow range with the rated 100% flow rate in the reactor core as a center. For example, if the flow rate in the reactor core is allowed to change over a range of from 80 to 120%, then the void fraction can be changed by about 9%.

Even with the structure in which a heat generating member (nuclear fuel substance) of which the calorific power decreases accompanying the burn, is placed in the water rod as disclosed in Japanese Patent Laid-Open No. 38589/1986, the void fraction in the water rod changes by about 30% at the greatest. The water in the water rod does not contribute to the cooling, and it is not allowed to much increase the sectional area of the water rod in the fuel assembly. If it is presumed that the sectional area of the water rod occupies 30% of the cooling water path in the fuel assembly, the effective void fraction change of 30% becomes 9% (30%× 0.3) if it is regarded as the whole fuel assembly. Further, since a fuel rod having a low enrichment is used as a heat generating member, the structure becomes complex and its production involves cumbersome operation.

To achieve a wide range of void fraction change, the flow rate in the water rod should be changed extremely greatly or the calorific power of the nuclear fuel substance in the water rod should be changed greatly. In fact, however, the flow rate or the calorific power cannot be greatly changed without employing the moving portions. Provision of the moving portions, however, poses problems from the stadpoint of reliability and makes the mechanism complex.

SUMMARY OF THE INVENTION

The object of the present invention is to provide a fuel assembly which is simply constructed and which is capable of greatly changing the internal average void fraction.

The aforementioned object is achieved by the provision of a resistance member at the lower end portion of the fuel assembly; a coolant ascending path in which the water rods have coolant inlet ports that are open in a region lower than the resistance member; and a coolant descending path which is communicated with the coolant ascending path and which has a coolant delivery port that is open in a region higher than the resistance member, in order to guide the coolant downwardly which is opposite to the direction in which the coolant flows in the coolant ascending path.

As the flow rate of the coolant that passes through the reactor core decreases, the coolant ascending path of the water rod is filled with water vapor and as the flow rate of the coolant increases, the amount of water vapor decreases conspicuously in the coolant ascending path. Therefore, the reactivity can be increased toward the last period of fuel cycle.

BRIEF DESCRIPTION OF DRAWINGS

FIG. 4 is a vertical section view of a fuel assembly according to a preferred embodiment of the present intention;

FIG. 5 is a partial section view of a fuel rod shown in FIG. 4;

FIG. 21 is a longitudinal sectional view of a fuel assembly according to another embodiment of the present invention;

FIG. 22 is a longitudinal sectional view of water rods used in the fuel assembly shown in FIG. 21;

DESCRIPTION OF PREFERRED EMBODIMENTS

Figure 1:
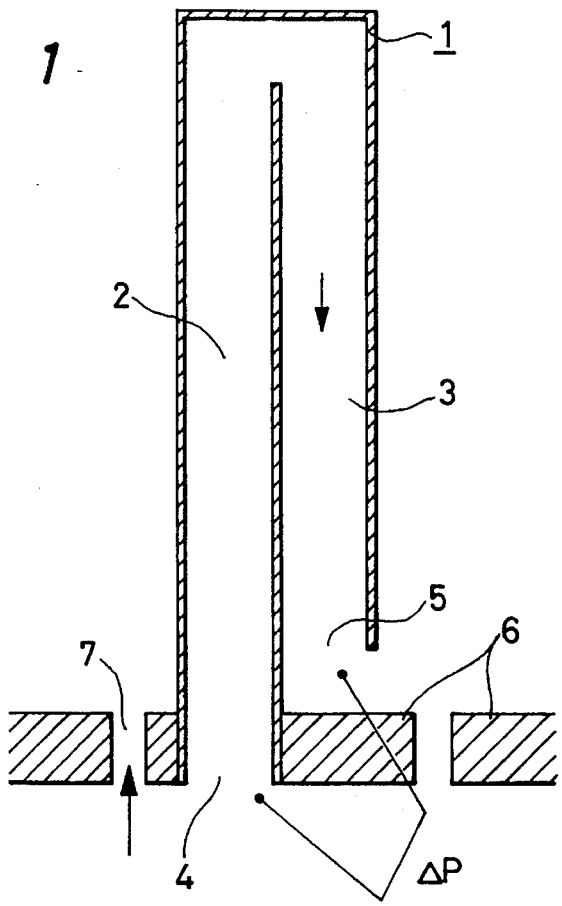
FIG. 1 is a diagram which illustrates the principle of a water rod used in the present invention.

The principle of the present invention will first be described prior to illustrating embodiments of the present invention. FIG. 1 illustrates the structure. Fundamentally, the fuel assembly is provided with a water rod 1 which has a coolant ascending path 2 of which a coolant inlet port 4 is open in a region lower than a resistance member such as fuel supporting portion of a lower tie plate) 6 provided at a lower portion of the fuel assembly, and which further has a coolant descending path 3 that downwardly guides the coolant from the coolant ascending path and that has a coolant delivery port 5 open in a region higher than the resistance member 6. The resistance member 6 has a plurality of coolant passage ports 7.

The pressure differential ΔP changes between the region lower than the resistance member 6 and the region higher than the resistance member 6 depending upon the change in the flow rate of the coolant (cooling water) that flows through the coolant passage ports 7 formed in the resistance member 6. The differential pressure caused by narrowing or broadening of the coolant path varies nearly in proportion to the square power of the flow rate of the cooling water. Therefore, if the flow rate of the cooling water passing through the resistance body 6 changes from 80% to 120%, the pressure differential ΔP increases by about 2.25 times.

Figure 2:
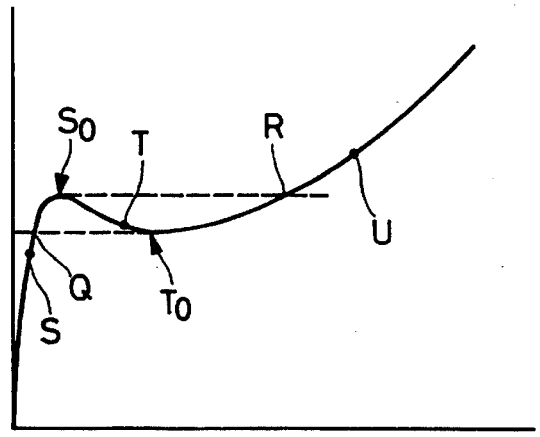
FIG. 2 is a diagram which schematically shows pressure differential characteristics that develop across the outlet and the inlet of the water rod of FIG. 12.

FIG. 2 illustrates a relationship between the flow rate of cooling water in the water rod 1 and the pressure differential between the inlet and the outlet of the water rod 1 (pressure differential between the coolant inlet port 4 and the coolant delivery port 5). If the flow rate of the cooling water is increased starting from zero, the pressure differential between the outlet and the inlet of the water rod 1 once reaches a maximum value. As the flow rate of the cooling water is further increased, the pressure differential between the outlet and the inlet of the water rod 1 once drops to a minimum value, and then increases monotonously. This is due to the phenomenon shown in FIGS. 3A to 3C.

Figure 3A:
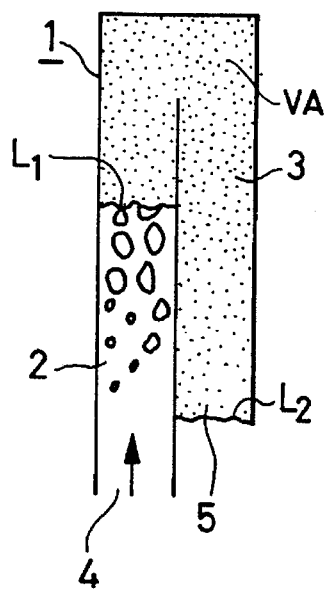
FIGS. 3A, 3B and 3C are diagrams illustrating the flow conditions in the water rod at points S, T and U of FIG. 2.
Figure 3B:
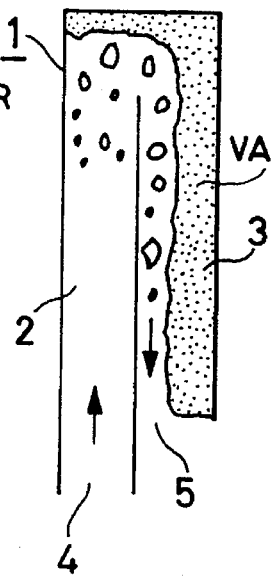
Figure 3C:
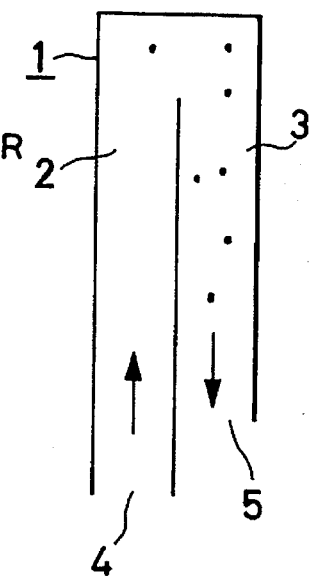

FIG. 3A shows the condition in the water rod 1 at a point S in FIG. 2, FIG. 3B shows the condition in the water rod 1 at a point T in FIG. 2, and FIG. 3C shows the condition in the water rod 1 at a point U in FIG. 2.

Being irradiated with neutrons and gamma rays from the fuel rods around the water rod 1, the cooling water in the water rod 1 generates the heat at a rate of about 0.5 to 2 W/cm². When the flow rate of the cooling water flowing through the water rod 1 is very small (condition of point S in FIG. 2), the cooling water in the water rod 1 generates the heat and evaporates being irradiated with neutrons and the like. The upper portions of the coolant ascending path 2 and the coolant descending path 3 are then filled with the vapor as shown in FIG. 3A. A liquid level $L_1$ is established in the coolant ascending path 2, and the pressure differential between the outlet and the inlet of the water rod 1 is generated by the difference in the static water head between the liquid level $L_1$ and the liquid level $L_2$ of the coolant delivery port 5 (outlet of the coolant descending path 3) of the water rod 1. The flow rate of the cooling water that flows into the coolant ascending path 2 maintains balance with respect to the flow rate by which the vapor flows out through the coolant delivery port 5.

As the flow rate of the cooling water is further increased from the point S in FIG. 2, the cooling water flows into the coolant ascending path 2 at a rate that is greater than the amount by which the cooling water is vaporized. In such a case (e.g., at the point T in FIG. 2), the cooling water flows down through the coolant descending path 3 as shown in FIG. 3B. At this moment, the static head in the coolant ascending path 2 is partly cancelled by the weight of the cooling water that flows through the coolant descending path 3, and the pressure differential between the outlet and the inlet of the water rod 1 becomes smaller that the maximum value $S_0$. As the flow rate of the cooling water further increases, however, the unsaturated water introduced through the coolant inlet port 4 is not boiled in the coolant ascending path 2 and the coolant descending path 3 (void fraction is very reduced), and is permitted to flow out through the coolant delivery port 5 (condition of point U in FIG. 2, FIG. 3C). Therefore, the water flows through the coolant ascending path 2 and the coolant descending path 3 almost in the form of a single phase stream. Under the condition of FIG. 3A, therefore, the static water heads at the level of the coolant ascending path 2 and at the level of the coolant delivery port 5 in the coolant descending path 3 are cancelled by each other, so that the difference in the static water head becomes very small. However, since the cooling water flows at a large rate in the water rod 1, the pressure loss increases due to friction and inversion in the flow of the cooling water, and the pressure differential increases again between the outlet and the inlet of the water rod 1.

Owing to the above-mentioned phenomenon, the flow rate of the cooling water in the water rod 1 varies greatly and the void fraction varies greatly even though the pressure differential varies little between the outlet port and the inlet port of the water rod 1.

Therefore, the void fraction can be changed greatly by changing the flow rate of the cooling water (flow rate in the reactor core) that flows in the fuel assembly, if the resistance of the resistance member 6 is so adjusted that the pressure differential between the outlet and the inlet of the water rod 1 is smaller than a pressure differential between the outlet and the inlet of the water rod 1 that corresponds to the minimum value $T_0$ of FIG. 2 when the flow rate in the reactor core is 80% and that the pressure differential between the outlet and the inlet of the water rod 1 is in excess of a pressure differential between the outlet and the inlet of the water rod 1 that corresponds to the maximum value $S_0$ of FIG. 2 when the flaw rate in the reactor core is 120%. In the above example, the flow rate of 80% in the reactor core lies on the left side of the maximum value $S_0$ and, preferably, lies on the left side of a point Q (pressure differential between the outlet and the inlet same as the minimum value $T_0$) in FIG. 2, and the flow rate of 120% in the reactor core lies on the right side of the minimum value $T_0$ and, preferably, lies on the right side of the point R (pressure differential between the outlet and the inlet same as the maximum value $S_0$) in FIG. 2.

An example of a fuel assembly utilizing the above-mentioned principle, i.e., an example of the structure of a fuel assembly to be used in a boiling-water reactor, will now be described in conjunction with FIGS. 4, 5, 6, 7A and 7B.

A fuel assembly 10 of this example is comprised of fuel rods 11, an upper tie plate 12, a lower tie plate 13, a fuel spacer 16, a channel box 17, and a water rod 19. The upper and lower ends of the fuel rods 11 are held by the upper tie plate 12 and the lower tie plate 13. The water rod 19, too, is held at its both ends by the upper tie plate 12 and the lower tie plate 13. Several fuel spacers 16 are arranged in the axial direction of the fuel assembly 10 to maintain an appropriate distance among the fuel rods 11. Between the fuel rods 11. Spaces 50 (second cooling water path) of a cooling water path is formed. The fuel spacers 16 are held by the water rod 19. The channel box 17 is mounted on the upper tie plate 12 to surround the outer periphery of a bundle of fuel rods 11 that are held by the fuel spacers 16. The lower tie plate 13 has a fuel rod supporting portion 14 at the upper end and has therein a space 15 under the fuel rod supporting portion 14. The lower ends of the fuel rods 11 and the water rod 19 are supported by the fuel rod supporting portion 14. With reference to FIG. 5, a number of fuel pellets 33 are loaded in a covering tube 30 whose both ends are sealed with an upper end plug 31 and a lower end plug 32. A gas plenum 34 is formed at an upper end of the covering tube 30. The water rod 19 has a diameter (outer diameter of an outer tube 21 that will be mentioned later) which is greater than the diameter of the fuel rod 11, and is arranged at the central portion in the cross section of the fuel assembly 10.

Structure of the water rod 19 will now be described in detail with reference to FIGS. 7A and 7B. The water rod 19 consists of an inner tube 20, an outer tube 21 and a spacer 22. The outer tube 21 and the inner tube 20 are arranged in concentric with each other, and the outer tube 21 surrounds the outer periphery of the inner tube 20. The upper end of the outer tube 21 is sealed with a covering portion 23, and the upper end of the covering portion 23 is held by the upper tie plate 12 being inserted therein. The covering portion 23 covers the upper end of the inner tube 20 so as to form a gap with respect to the upper end of the inner tube 20. The upper rod of the inner tube 20 is secured to the inner surface of the outer tube 21 via plate-like spacers 22 that are radially arranged from the axis of the water rod 19. The lower end of the outer tube 21 is sealed with a sealing portion 24. The lower end of the inner tube 20 penetrates through the sealing portion 24 to protrude downwardly. The lower end of the inner tube 20 penetrates through the fuel rod supporting portion 14 of the lower tie plate 13. A coolant inlet port 28 formed in the lower end of the inner tube 20 is open in the space 15 of the lower tie plate 13. The interior of the inner tube 20 forms a coolant ascending path 25. An annular path formed between the inner tube 20 and the outer tube 21 defines a coolant descending path 26. A plurality of cooling water delivery ports 29 are formed in the wall at the lower end of the outer tube 21 in the circumferential direction. The cooling water delivery ports 29 are formed in the circumferential direction maintaining an equal distance and are open in the space 50 over the fuel rod supporting portion 14. In this embodiment, the fuel rod supporting portion 14 exhibits the function of the resistance member 6 of FIG. 1.

The cooling water ascending path 25 and the cooling water descending path 26 are communicated with each other through an inverting portion 27 formed at an upper end of the water rod 19. Thus, the water rod 19 contains therein a cooling water path (first cooling water path) of an inverted U-shape which consists of the cooling water ascending path 25, the cooling water descending path 26 and the inverting portion 27.

When the fuel assembly 1 of this embodiment is loaded in the reactor core of the boiling-water reactor (the whole fuel assemblies are represented by the fuel assemblies 1) to operate the boiling-water reactor, most of the cooling water is directly introduced into space 80 among the fuel rods 11 of the fuel assembly 10 loaded in the reactor core passing through space 15 of the lower tie plate 13 and penetration holes 18 (FIG. 74) formed in the fuel rod supporting portion 14. The remainder of the cooling water that flows into space 15 in the lower tie plate 13 flows through the coolant inlet port 28 into the coolant ascending path 25 of the water rod 19, and is delivered into the space 80 over the fuel rod supporting portion 14 through the inverting portion 27, the coolant descending path 26 and the coolant delivery ports 29. The cooling water delivered from the cooling water delivery ports 29 may be in the form of a liquid or a gas (vapor) depending upon the flow rate of the cooling water that flows into the water rod 19 through the cooling water inlet port 28 as described earlier. According to this embodiment, the pressure loss by the fuel rod supporting portion 14 and the specifications of the inner tube 20 and the outer tube 21 have been selected in advance, so that the condition of FIG. 3A develops in the water rod 19 when the flow rate in the reactor core is smaller than 100% (flow rate at the maximum value $S_0$ of FIG. 2 in the water rod 19), and the condition of FIG. 3C develops in the water rod 19 when the flow rate in the reactor core is 110% (flow rate at the point R of FIG. 2 in the water rod 19).

Concretely described below is how to operate the boiling-water reactor while changing the void fraction in the water rod 19 under the condition where the fuel assembly 10 is loaded in the reactor core of the boiling-water reactor. This operation method applies for one fuel cycle (operation period of a nuclear reactor from when the fuel in the reactor core is replaced and operation of the nuclear reactor is started to when the nuclear reactor is stopped for renewing the fuel, i.e., usually, one year).

In the boiling-water reactor as disclosed in Japanese Patent Publication No. 11038/1982, Col. 8, line 19 to Col. 10, line 31, the control rods are operated and the flow rate in the reactor core is adjusted to raise the atomic output up to 100% (point N in FIG. 7 of the above publication and 80% flow rate in the reactor core in this embodiment) in order to prevent the fuel from breaking. The flow rate in the reactor core is increased to compensate the reduction of reactor output as the nuclear fuel substance is consumed, i.e., to maintain the reactor output at 100%. When the flow rate in the reactor core has reached 100% owing to the compensation operation, the flow rate in the reactor core is decreased to 20% and the control rods are pulled out until the nuclear reactor produces a predetermined output as disclosed in Japanese Patent Publication No. 11038/1982, Col. 11, line 23 to Col. 12, line 40 (Col. 9, line 47 to Col. 10, line 51 of U.S. Pat. No. 4,279,698). Thereafter, the flow rate in the reactor core is increased to 80% to maintain the reactor output at 100%. To maintain the reactor output at 100%, the control operation is repeated.

According to this embodiment, the output of the nuclear assembly is flattened in the axial direction by utilizing nuclear characteristics. After the flow rate in the reactor core has been decreased, therefore, the control rods are pulled out; i.e., there is no need of pulling out the control rods or there is no need of inserting other control rods unlike the art disclosed in Japanese Patent Publication No. 11038/1982 Col. 12, lines 19 to 29 (U.S. Pat. No. 4,279,698, Col. 10, lines 21 to 34), and what is needed is to pull out only those control rods that are deeply inserted. As described above, the operation for obtaining 100% of reactor output with the flow rate in the reactor core of smaller than 100% is continued for about 70% of a fuel cycle period. During the period of about 70%, the water rod 19 in the fuel assembly 1 assumes the condition as shown in FIG. 3A. That is, the upper portion of the coolant ascending path 25 and the interior of the coolant descending path 26 are filled with the vapor; i.e., the liquid cooling water does not almost exist in the vapor region which is formed in the water rod 19 in the fuel assembly 1 loaded in the reactor core. Therefore, up to 70% of the fuel cycle, the vapor region is formed in the water rod 19, and the cooling water in the reactor core is partly expelled.

It can be said that the fuel assembly 10 according to this embodiment is provided with a water rod that has a vapor reservoir. The coolant descending path 26 works as a vapor reservoir until the flow rate in the reactor core exceeds 100% as will be described later. Formation of the vapor region in the water rod 19 suppresses the effect for decelerating neutrons and promotes the conversion of uranium 238 into plutonium 239 in the nuclear fuel substance. Suppression of the neutron deceleration effect results in the suppression of nuclear fission such as of uranium 235 and results in the decrease in the reactivity. Decrease in the reactivity, however, can be alleviated by pulling out the control rods by an increased amount. During this period, new core materials such as plutonium 239 and the like may be formed, and the core material in the reactor core decreases at a reduced rate. According to this embodiment as described above, the surplus reactivity (surplus neutrons) is absorbed by uranium 238 in the nuclear fuel substances to form a new core material.

By the time when the operation period of the boiling-water reactor reaches about 70% of the fuel cycle, the surplus reactivity in the reactor core will have been lowered to a minimum level for maintaining the criticality. In this case, the flow rate in the reactor core is gradually increased in excess of 100%; i.e., the flow rate in the reactor core is increased to 120% at the time when the operation of a fuel cycle is stopped. The recirculation pump does not hinder the operation at all if the flow rate in the reactor core does not exceed 120%. The output of the nuclear reactor is maintained at 100% from when the flow rate in the reactor core exceeds 100% until when it reaches 120%. When the flow rate in the reactor core is greater than 110%, the interior of the water rod 19 assumes the condition of FIG. 3C where the liquid flows in the form of a single-phase stream and no vapor stays in the coolant descending path 26. As the flow rate in the reactor core becomes greater than 110%, therefore, the amount of cooling water (the number of hydrogen atoms) in the reactor core increases remarkably compared with when the flow rate in the reactor core is smaller than 100%, and whereby the effect increases for decelerating the neutrons, and hence nuclear fission of uranium 235 and the like becomes active. Accordingly, the infinite multiplication factor of the fuel assembly increases and it is made possible to effectively utilize the core materials.

The fuel assembly 1 experiences the fuel cycle operation four times in the reactor core. Therefore, the conditions of FIG. 3A and 3B are alternatingly repeated four times each.

Figure 8:
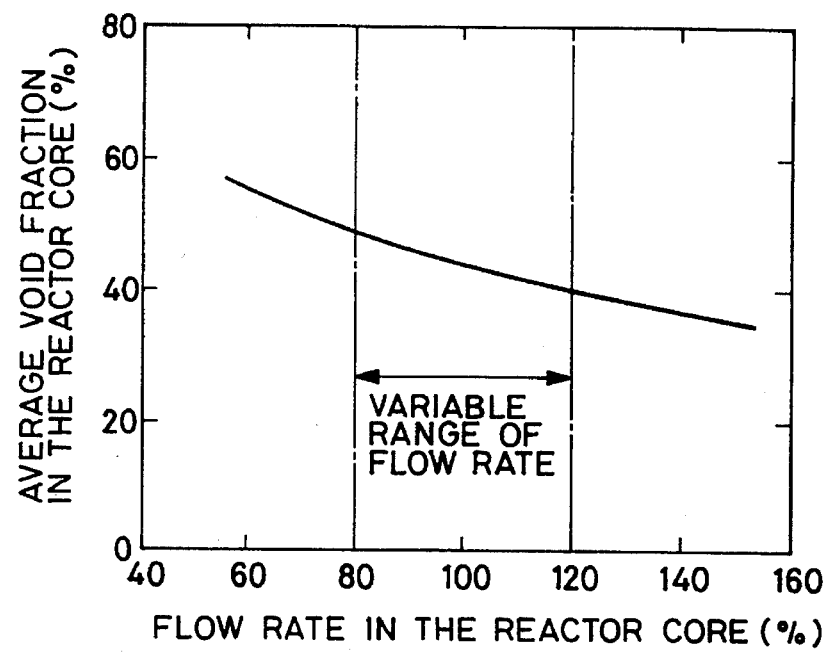
FIG. 8 is a diagram illustrating a relationship between the reactor core flow rate and the average void fraction in the reactor core.

According to the fuel assembly 10 of this embodiment as described above, the water rod is made up of a simply constructed double tube. Therefore, the phase condition of the cooling water in at least the coolant descending path 26 can be successively changed from the gaseous state to the liquid state by means which controls the output of the nuclear reactor (by means which adjusts the flow rate in the reactor core and which may be a recirculation pump). That is, the range in which the average void fraction changes in the fuel assembly 10 can be greatly broadened being added up with the range of void fraction change due to the water rod 19. Concretely speaking, the flow rate in the reactor core in this embodiment is increased to 80 to 120%, so that the average void fraction of the fuel assembly 10 changes as shown in FIG. 8. This is due to the change of void fraction outside the water rod 19. The fuel assembly 10 exhibits an average void fraction change on which is superposed an average void fraction change produced by the water rod 19. Therefore, the nuclear fuel substances can be effectively utilized with a simply constructed structure, and the operation period of a fuel cycle can be greatly extended.

Described below is another operation control to substitute for the aforementioned operation control. According to Japanese Patent Publication No. 44237/1983 (U.S. Pat. No. 4,285,769), a fuel cell constituted by four adjoining fuel assemblies is divided into a controlled cell and a noncontrolled cell, the average enrichment of the controlled cell is selected to be smaller than that of the noncontrolled cell, and the output of the nuclear reactor under the ordinary operation condition is controlled by the control rods only that are inserted in the controlled cell. On Col. 27, line 29 to Col. 28, line 43 of Japanese Patent Publication No. 44237/1983 (U.S. Pat. No. 4,285,769, Col. 16, lines 6 to 65), there is described that the control rods inserted in the controlled cell (c cell) are driven by a control rod driving device of the type of fine movement. After the boiling-water reactor is started, the control rods in the controlled cell and the flow rate in the reactor core are adjusted to maintain 100% output of the nuclear reactor with a 80% flow rate in the reactor core. Reduction of the reactor output due to the consumption of the core material is compensated by increasing the flow rate in the core before the flow rate in the core reaches 100% and after the flow rate has reached 100%, by gradually pulling out the control rods from the controlled cell by the Control rod drive device while maintaining the flow rate in the reactor core at 100%. After 70% period of the fuel cycle, operation of the control rods is stopped and the flow rate in the reactor core is gradually increased up to 120%. During the period of up to 70% of the fuel cycle, the water rod 19 is filled with the water vapor as mentioned earlier and after 70% of the fuel cycle, the void fraction in the water rod 19 can be markedly reduced.

In the aforementioned embodiment, the inverting portion 27 is arranged at a position over the position of a gas plenum 34 of the fuel rod 11, i.e., over the upper end of the fuel pellet-filled region. The lower end of the coolant descending path 26 is located at a position at least under the upper end (lower end of gas plenum 34) of the fuel pellet-filled region (region filled with fuel pellets 33) of the fuel assembly 1. In other words, the vapor reservoir of the water rod 19 should be located at a position at least lower than the upper end of the fuel pellet-filled region of the fuel assembly. In particular, in order that the vapor region is uniformly distributed in the axial direction of the fuel pellet-filled region where nuclear fission takes place in the nuclear assembly, the cooling water delivery ports 29 (or vapor delivery ports of the vapor reservoir) of the coolant descending path 26

(vapor reservoir) should be located near the lower end of the fuel pellet-filled region or desirably at a position (near the fuel rod supporting portion 14) under the fuel pellet-filled region. Namely, the vapor region under the condition of FIG. 3A is formed over the full length in the axial direction of the fuel pellet-filled region, and the output distribution of the fuel assembly 1 is flattened in the axial direction.

In this embodiment in which the coolant descending path 26 surrounds the periphery of the coolant ascending path 25, the neutron deceleration effect of when the coolant ascending path 25 and the coolant descending path 26 are substantially filled with liquid cooling water and the effect of converting into plutonium of at least when the coolant descending path 26 is filled with the vapor, can be uniformly imparted to the fuel rods that surround the water rod 19.

By lowering the position of the inverting portion 27 from the upper end of the fuel pellet-filled region, furthermore, there can be employed a short water rod 19 having a length shorter than the fuel rods 11. In this case, pressure loss in the fuel assembly can be decreased.

Referring to FIG. 2, difference in the flow rates in the reactor core between the maximum value $S_0$ and the minimum value $T_0$, pressure differential between the outlet and the inlet of the water rod 19 for the maximum value $S_0$, and pressure differential between the outlet and the inlet of the water rod 19 for the minimum value $T_0$, undergo the change depending upon the sizes of the inner tube 20 and the outer tube 21. This will now be described.

Figure 9:
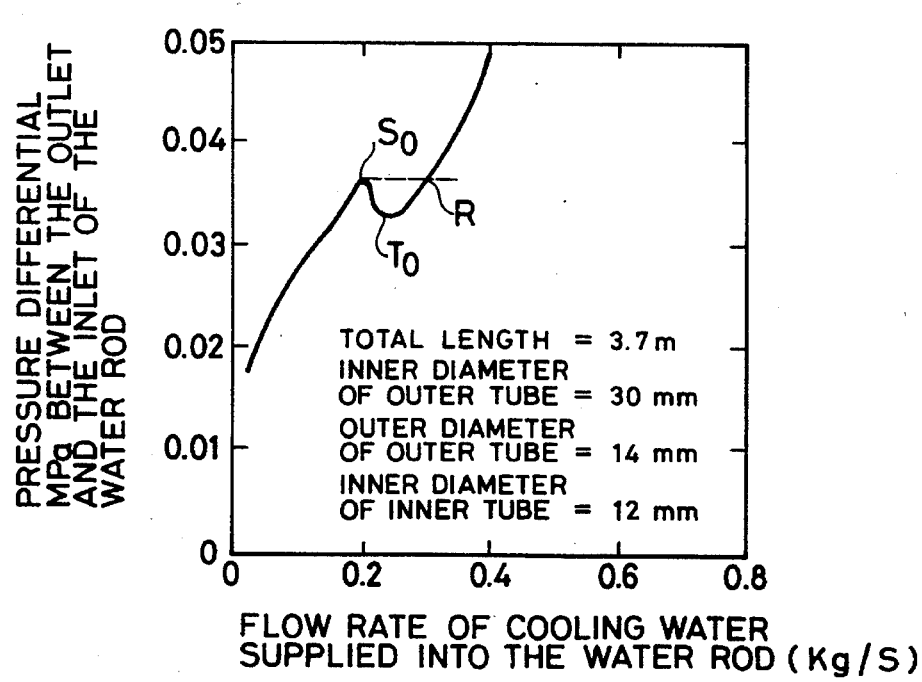
FIGS. 9, 11 and 13 are diagrams illustrating relationships between the pressure differential across the outlet and the inlet of the water rod and the flow rate of cooling water supplied into the water rods having inner tubes of dissimilar sizes.
Figure 10:
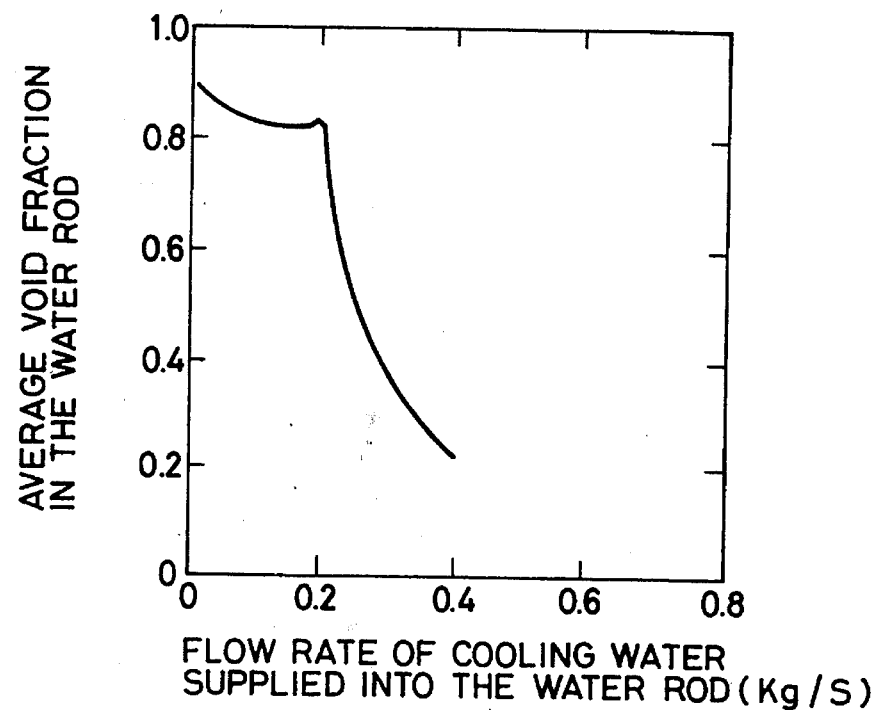
FIGS. 10, 12 and 14 are diagrams illustrating relationships between the average void fraction in the water rod and the flow rate of cooling water supplied into the water rods that correspond to FIGS. 9, 11 and 13.
Figure 11:
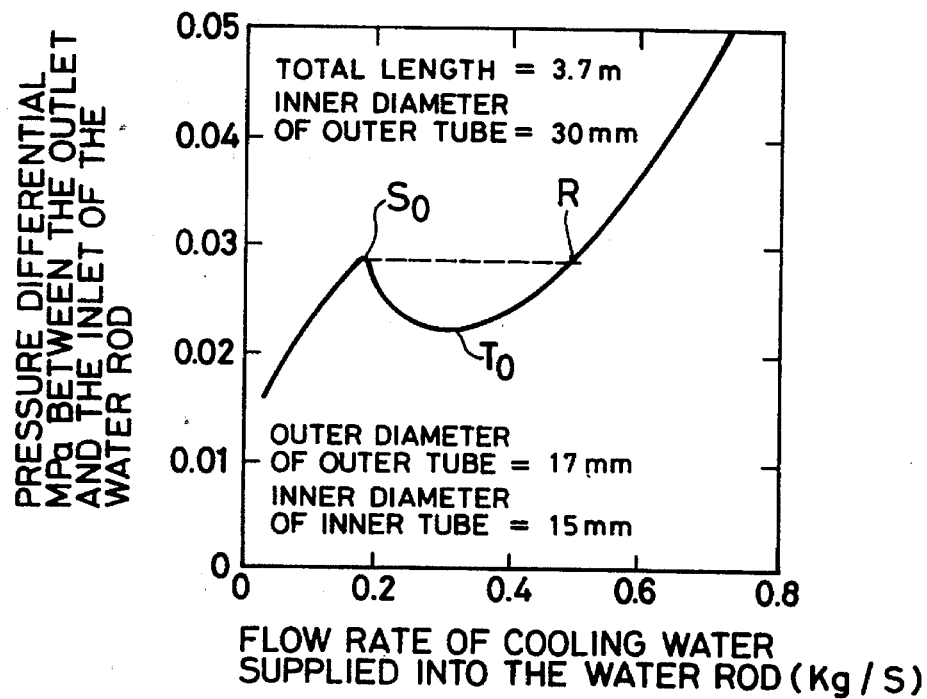
Figure 12:
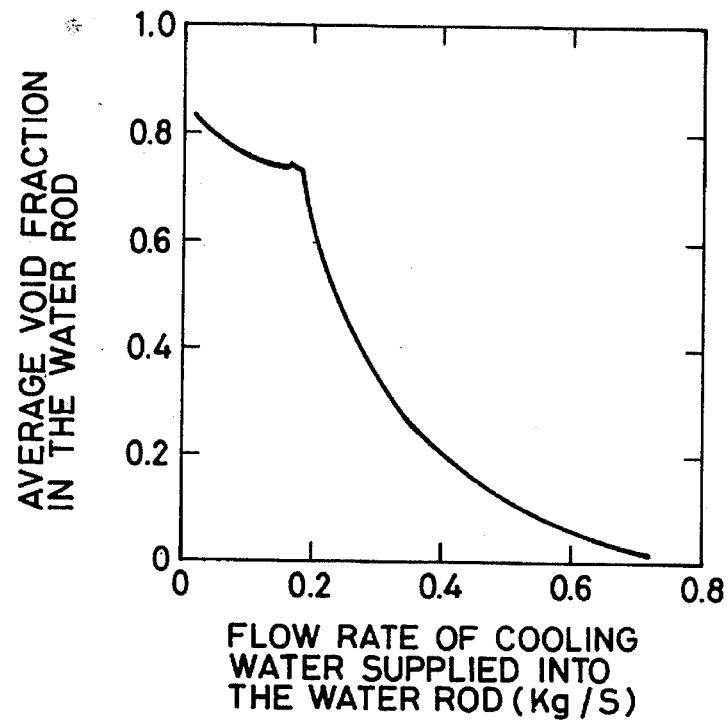
Figure 13:
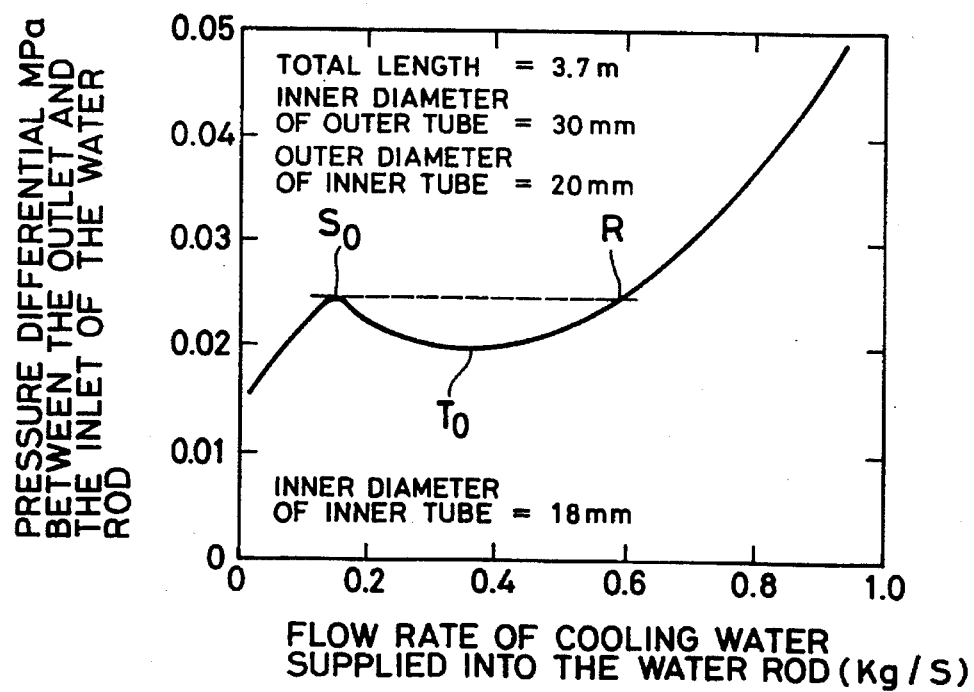
Figure 14:
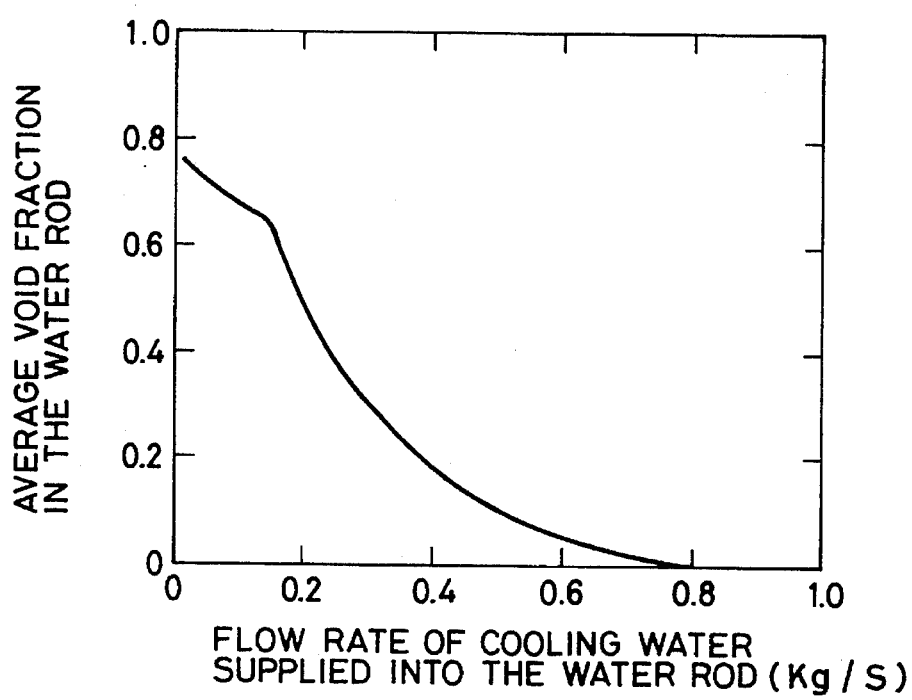

FIGS. 9, 11 and 13 illustrate changes of pressure differential between the outlet and the inlet of the water rod 19 for the flow rate of cooling water supplied into the water rod 19 when the outer tube 21 has an inner diameter of 30 mm and when the inner diameter and outer diameter of the inner tube 20 are changed. FIG. 9 shows the characteristics when the inner tube 20 has an outer diameter of 14 mm and an inner diameter of 12 mm, FIG. 11 shows the characteristics when the inner tube 20 has an outer diameter of 17 mm ant an inner diameter of 15 mm, and FIG. 13 shows the characteristics when the inner tube 20 has an outer diameter of 20 mm and an inner diameter of 18 mm. FIGS. 10, 12 and 14 illustrate changes of the average void fraction in the water rod for the flow rate of cooling water supplied into the water rod, that correspond to FIGS. 9, 11 and 13.

When the inner tube 20 is thin as will be obvious from FIG. 9, a maximum value is reached with a flow rate of cooling water which is greater than that of the thick inner tube 20 (FIGS. 11 and 13), and the pressure differential thereafter changes suddenly. Therefore, the range for changing the flow rate of the cooling water is small compared with the range for changing the pressure differential. This is due to the fact that since the inner tube 21 is thin, the heat is generated in small amounts in the inner tube 20 and the flow rate of the cooling water decreases, that surpasses the amount of vapor generated in the inner tube 20, and that the fluid flows through the inner tube 20 at such a high speed that the flow resistance increases. When the sectional area of the coolant descending path 26 between the inner tube 20 and the outer tube 21 is great and the flow rate is small, however, the void is almost 100% in the coolant descending path 26. Therefore, the range in which will change the average void fraction of the water rod having a thin inner tube 20 is little different from that of the water rod having a thick inner tube 20. On the other hand, the thicker the inner tube 20 of the water rod, the smaller the variable range of the pressure differential relative to the variable range of the cooling water. In any case, however, the average void fraction decreases sharply as a maximum value of the pressure differential is exceeded as will be obvious from FIGS. 10, 12 and 14. Referring to FIGS. 9, 11 and 13, furthermore, the average void fraction in the water rod for the flow rate of cooling water greater than a point R is conspicuously smaller than the average void fraction for the flow rate of cooling water smaller than the maximum value $S_0$.

Figure 15:
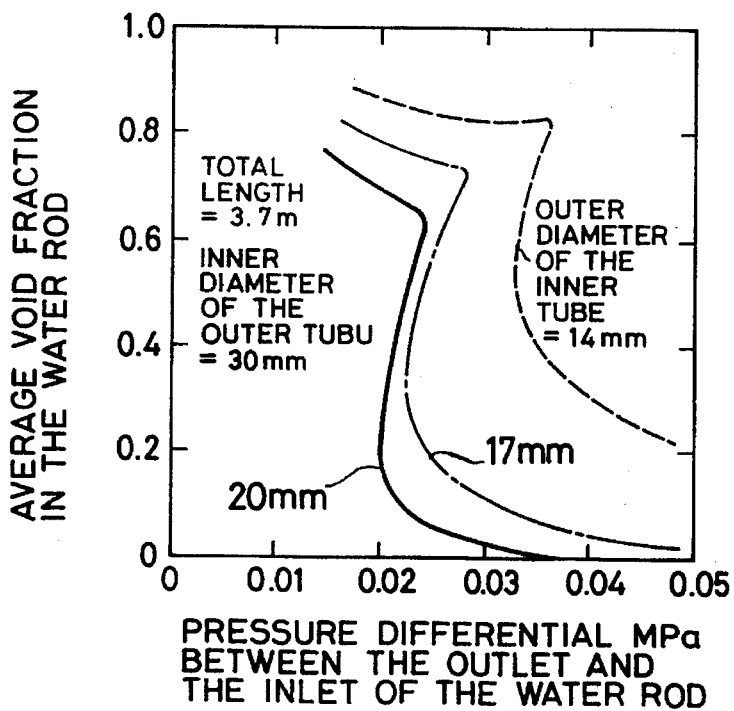
FIG. 15 is a diagram illustrating a relationship between the average void fraction in the water rod and the pressure differential across the outlet and the inlet of the water rod.

FIG. 15 illustrates a relationship between the average void fraction in the water rod 19 and the pressure differential between the outlet and the inlet of the water rod 19, such that the contents of FIGS. 9 to 14 can be easily comprehended. As will be obvious from FIG. 15, the average void fraction of the water rod drops from 76% to 2% when the pressure differential is changed from 0.015 MPa to 0.03 MPa between the outlet and the inlet of the water rod 19 which employs the inner tube having an outer diameter of 20 mm. The pressure loss of the fuel rod supporting portion 14 of the lower tie plate 2 varies nearly in proportion to the square power of the flow rate of cooling water that flows in the fuel assembly 1 as mentioned earlier. Therefore, if the pressure differential between the outlet and the inlet of the water rod is set to be 0.015 MPa when the flow rate of cooling water that flows through the fuel assembly 1 is 80%, the pressure differential becomes 0.034 MPa when the flow rate of cooling water is 120%, and the average void fraction becomes 1% in the water rod. Therefore, the variable range of average void fraction in the water rod 19 is 75%; i.e., the variable range of average void fraction is 7.5% with the fuel assembly 10 as an average. Accordingly, a net variable range of average void fraction of the fuel assembly 10 is 16.5% being added up with 9% by the flow rate in the reactor core of FIG. 8.

Figure 6:
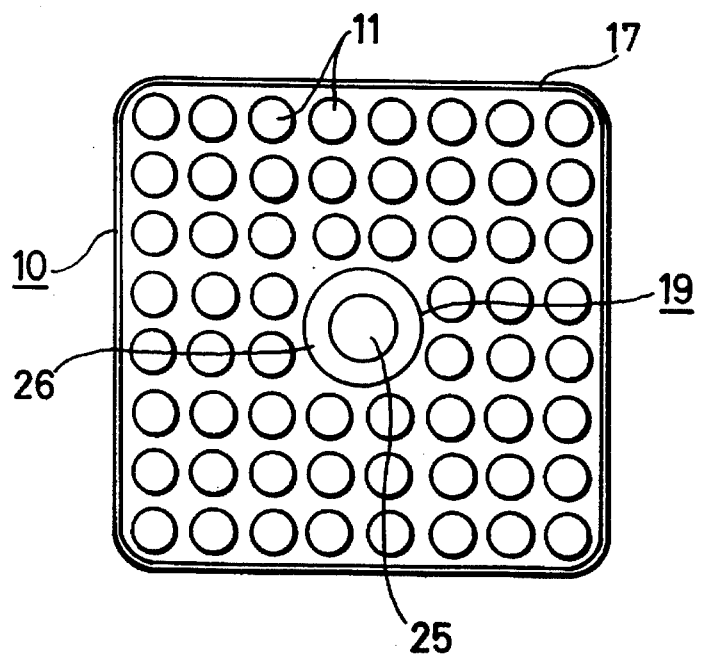
FIG. 6 is a section view along a line III—III of FIG. 4.
Figure 16:
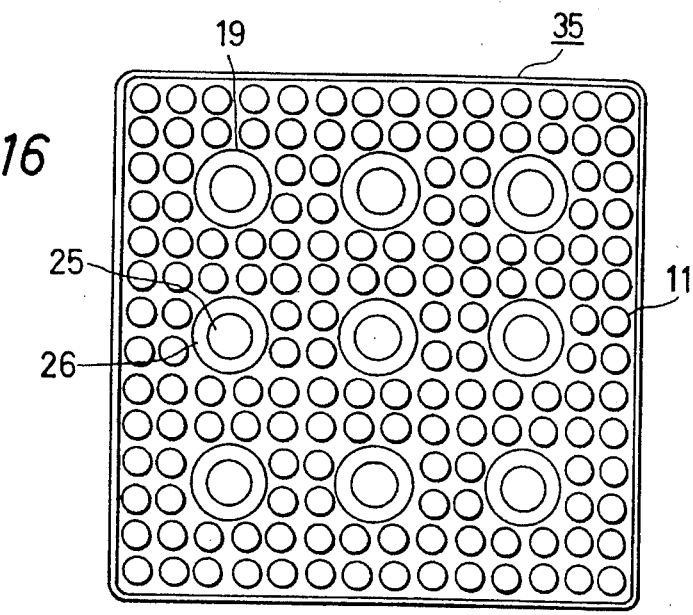
FIG. 16 is a lateral section view of the fuel assembly according to another embodiment of the present invention.

As shown in FIG. 6, the water rod 19 occupies about one-tenth the sectional area of the coolant path of the fuel assembly 10. Here, the variable range of average void fraction of the fuel assembly can be increased by providing two or more water rods 19 in the fuel assembly. To improve fuel economy, there has been proposed a fuel assembly which is provided with nine water rods. In this case, the water rods as a whole occupy about 30% the sectional area of the coolant path of the fuel assembly. A fuel assembly 35 of this embodiment is shown in FIG. 16. The fuel assembly 35 is the one in which the water rods of the fuel assembly disclosed in Japanese Patent Application No. 167972/1986, page 9, line 4 to page 11, line 5, and FIG. 1 are all replaced by the above-mentioned water rods 19. The fuel assembly 35 of this embodiment further exhibits the effect of the fuel assembly 1 of Japanese Patent Application No. 167972/986 (effect of reactivity gain shown in FIG. 3 of this prior application).

Figure 17:
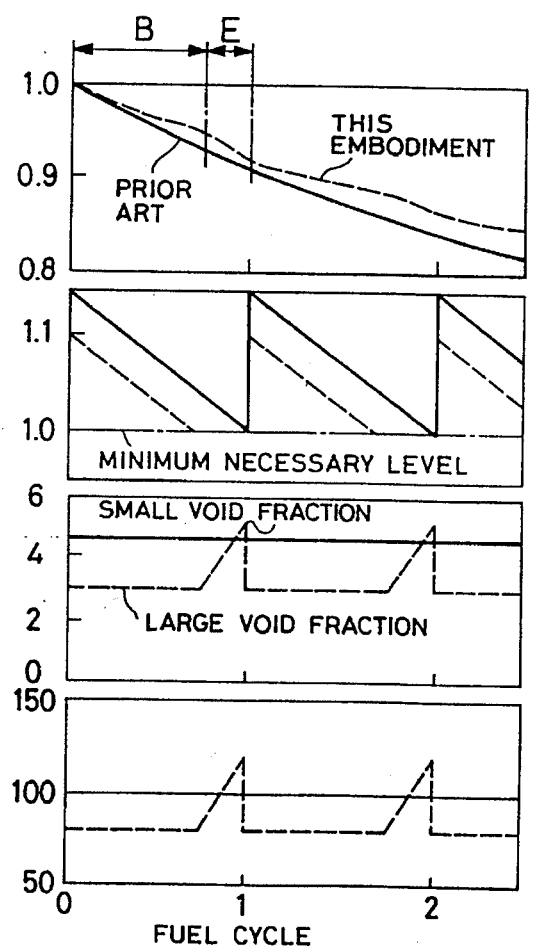
FIG. 17 is a diagram illustrating changes in the amount of core material in the nuclear fuel material for a fuel cycle of the fuel assembly of FIG. 16, average surplus reactivity in the core, ratio of hydrogen atom density to uranium atom density, and flow rate in the reactor core.

Described below is the operation of the boiling-water reactor in which the fuel assembly 35 of this embodiment is loaded in the reactor core. The whole fuel assemblies in the reactor core is represented by the fuel assembly 35. FIG. 17 illustrates the change of characteristics of the case when the boiling-water reactor loaded with the fuel assembly 35 is operated with two continuous fuel-cycles. Broken lines indicate the case of this embodiment and solid lines indicate the case when use is made of the fuel assembly 35 which has conventional rods 19 (without coolant descending path 26). In the former case, the spectrum shift operation is carried out while changing the void fraction and in the latter case, no spectrum shift operation is carried out. The output of the nuclear reactor during the fuel cycle period is controlled by using the method disclosed in Japanese Patent Publication No. 44237/1983. The flow rate in the reactor core should range from 80 to 120% to maintain the output of the nuclear reactor at 100%.

According to this embodiment, the inner tube 20 and the outer tube 21 have been so specified that the condition of FIG. 3A is established in the water rod 19 when the flow rate in the reactor core is smaller than 80% and that the condition of FIG. 3C is established in the water rod 20 when the flow rate in the reactor core is 110%. The flow rate of 80% in the reactor core is the one which corresponds to the maximum value $S_0$ of FIG. 2 at which the cooling water is supplied into the water rod 19, and the flow rate of 110% in the reactor core is the one which corresponds to the point R of FIG. 2 at which the cooling water is supplied into the water rod 19.

During the period of up to 70% of both the first fuel cycle and the second fuel cycle, the flow rate in the reactor core is maintained at 80% as shown in FIG. 17(*d*) and the change in the output of the nuclear reactor due to the consumption of the core material is compensated by gradually pulling out the control rods using a finely-driving control rod driving device. From 70% of the fuel cycle to the end of the fuel cycle, the flow rate in the reactor core is gradually increased from 80% to 120% while halting the operation of the control rods. With the output of the nuclear reactor being controlled as described above, the surplus reactivity in this embodiment is maintained at a minimum level necessary for criticality for a predetermined period of time (FIG. 17(*b*)) at the end of each of the fuel cycles. Furthermore, the ratio of hydrogen atom density to uranium atom density greatly increases toward the end of each of the fuel cycles (FIG. 17(*c*)). The core material in the nuclear fuel material loaded in the reactor core is consumed in small amounts during the period B of from the start of the fuel cycle to 70% of the fuel cycle, and is consumed in large amounts during the period E of from 70% of the fuel cycle to the end of the fuel cycle, as shown in FIG. 17(*a*).

In this embodiment which employs nine water rods 19, the whole water rods occupy 30% of the sectional area of the coolant path of the fuel assembly 35 as mentioned above, and the variable range of the average void fraction of the fuel assembly 35 is increased by as great as 22.5% owing to the function of nine water rods 19. In practice, however, to this value is further added 9% of FIG. 8. Therefore, the nuclear fuel substances can be very effectively utilized, the period of a fuel cycle can be markedly extended for operating the nuclear reactor, and the fuel assembly 5 can be simply constructed.

It is further possible to change the shape of nine water rods 19 of the fuel assembly 35 (e.g., to differ the inner diameter of the inner tube 20 of nine water rods 19) to vary the transition period from the state of FIG. 3A to the state of FIG. 3C.

Figure 18A:
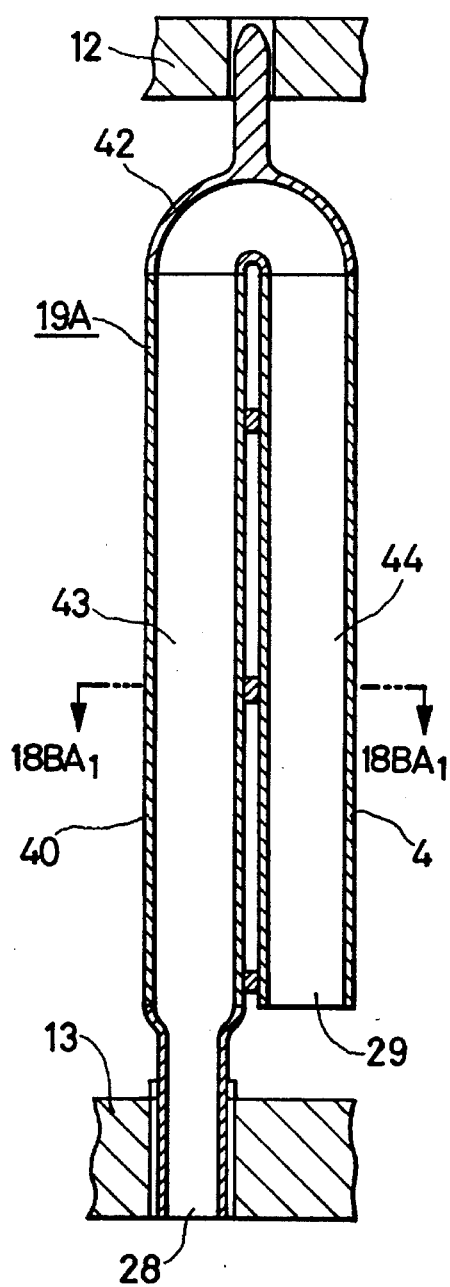
FIG. 18A is a vertical section view of water rods according to further embodiments.
Figure 19:
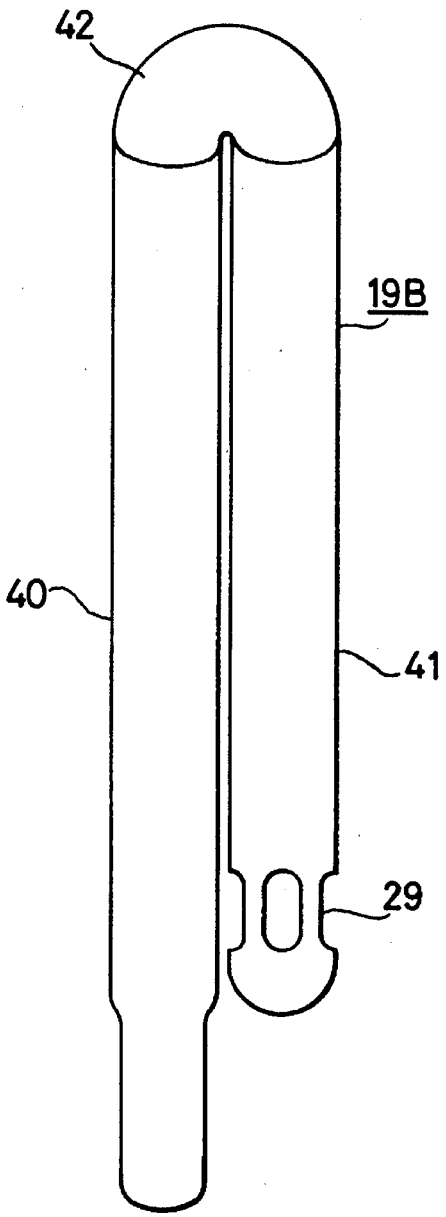
FIG. 19 is a side view of the water rods according to further embodiments.

FIGS. 18A and 19 illustrate further embodiments of the water rod 19 employed for the fuel assembly 10 and the fuel assembly 35.

Figure 18B:
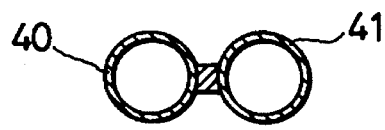
FIG. 18B is a section view along a line $A_1$—$A_1$ of FIG. 18A.

In the water rod 19A of FIGS. 18A and 18B, a coolant ascending tube 40 and a coolant descending tube 41 are coupled together through a coupling tube 42, thereby to form a coolant ascending path 43 and a coolant descending path 44. The water rod 19A exhibits the function same as that of the water rod 19, but presents an advantage in that the metal has a small sectional area with respect to the area occupied by the water rods. In this embodiment, the coolant delivery port 29 is opened downwardly and may be affected by the dynamic pressure of the cooling water that flows upwardly in the fuel assembly. In the similar way as in the embodiment shown in later-appearing FIG. 21, the coolant ascending tube 40 of this embodiment changes from a large diameter tube portion to a small diameter tube portion (the outside diameter of which is smaller than that of the large diameter tube portion) between the fuel spacer located at the lowermost position and the fuel rod supporting portion 14. The small diameter tube portion is positioned below the large diameter tube portion.

The cooling water descending tube 41 is coupled to the cooling water ascending tube 40 by a support member 45. Therefore, flow vibration of the cooling water descending tube 41 due to cooling water flowing through the outside of the water rod 19A can be restricted. Further, in the similar way as the embodiment shown in later-appearing FIG. 21, the outer peripheral surfaces of both the cooling water ascending tube 40 and the cooling water descending tube 41 come into contact with cooling water. Therefore, even when these tubes are full of the vapor, the temperature of the cooling water ascending tube 40 and the cooling descending tube 41 can be lowered.

In the water rod 19B of FIG. 19, the lower end of the descending tube 16 is closed and delivery ports 29 are formed in the side surface of the descending tube 16 so as not to be affected by the dynamic pressure.

Figure 20:
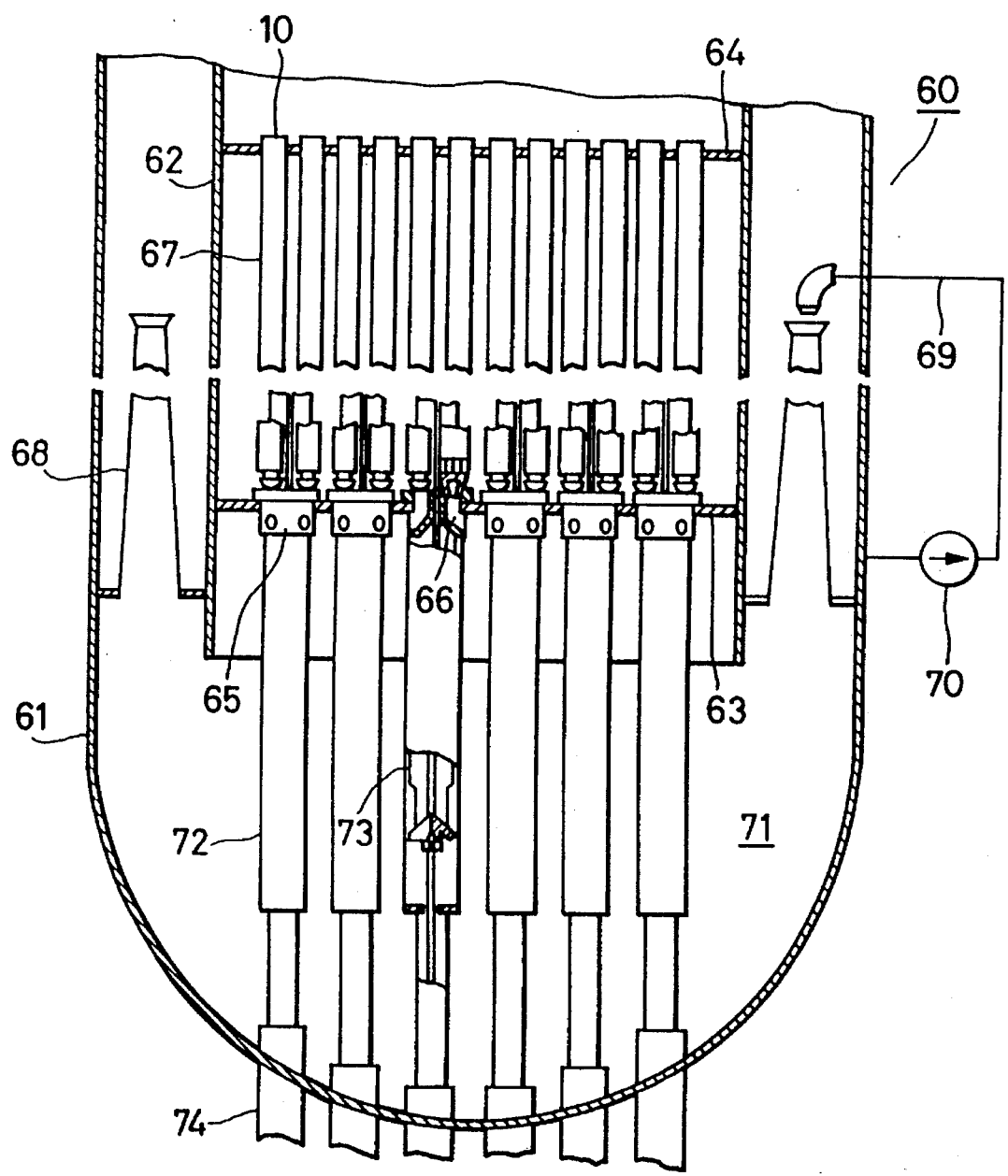
FIG. 20 is a local vertical section view of a boiling-water reactor in which the fuel assembly of FIG. 1 is loaded.

Finally, the structure of the boiling-water reactor in which the above-mentioned fuel assembly is loaded will now be described in conjunction with FIG. 20.

A boiling-water reactor 60 has a reactor pressure vessel 61, a recirculation pump 70 and a reactor core 67 loaded with the fuel assembly 10. A reactor core shroud 62 is arranged in the reactor pressure vessel 61 and is mounted therein. Jet pumps 68 are arranged between the reactor pressure vessel 61 and the reactor core shroud 62. A lower support plate 63 of the reactor core is mounted on the lower end of the reactor core shroud 62 and is arranged therein. A plurality of fuel support metal fittings 65 penetrate through the lower support plate 63 of the reactor core and are installed on the lower support plate 63 of the reactor core. Upper lattice plates 64 are arranged in the reactor core shroud 62 and are mounted thereon. A plurality of control rod guide tubes 72 are installed in a lower plenum 71 under the lower support plate 63 of the reactor core. Housings 74 of control rod drive devices are mounted on the bottom of the reactor pressure vessel 61. A recirculation conduit 69 which communicates the reactor pressure vessel 61 with the reactor core shroud 62 it open at the upper end of the jet pumps 68. The recirculation conduit 69 is provided with the recirculation pump 70. Control rods 73 are arranged in the control rod guide tubes 72, and are linked to control rod driving devices (not shown) installed in the housings 72 of the control rod drive devices. The lower tie plates 13 of the fuel assembly 10 are inserted in and are held by the fuel support metal fittings 65, and the upper ends thereof are supported by the upper lattice plates 62. Being driven by the control rod drive devices, the control rods 73 are inserted among the fuel assemblies 10 penetrating through the fuel support metal fittings 65.

The cooling water is supplied into the reactor core 67 as described below. That is, the recirculation pump 70 is driven, and the cooling water between the reactor pressure vessel 61 and the reactor core shroud 62 is injected to the upper end of jet pump 68 through the recirculation conduit 69. The cooling water between the reactor pressure vessel 31 and the reactor core shroud 62 is further intaken by the jet pump 68 as the cooling water is injected. The cooling water delivered from the jet pump 68 flows into the lower plenum 71 and into the cooling water paths 66 of the fuel support metal fittings 65, and is supplied into the fuel assembly 10 via the lower tie plate 13.

When the nuclear reactor is producing the output of a low level, the control rods 72 are pulled out from the reactor core to increase the output of the nuclear reactor. The output of a high level of the nuclear reactor can be controlled by changing the number of revolutions of the recirculation pump 70 and by increasing or decreasing the flow rate in the reactor core.

By pulling out the control rods and by adjusting the flow rate in the reactor core, the nuclear reactor produces a rated 100% output with a flow rate in the reactor core of 80%. The operation for compensating the decrease of reactor output due to the consumption of the core material and the poeration for shifting the flow condition in the water rod 19 from the condition of FIG. 3A to the condition of FIG. 3C, are performed by increasing the flow rate in the reactor core, i,e., by increasing the number of revolutions of the recirculation pump 70. With the recirculation pump running at a speed that produces the flow rate of smaller than 100% in the reactor core, the condition of FIG. 3A is established in the water rod 19 whereby the vapor is built up in the coolant descending path 26. With the recirculation pump running at a speed that produces the flow rate of greater than 110% in the reactor core, the condition of FIG. 3C is established in the water rod 19, and no vapor is built up. It can therefore be said that the recirculation pump 70 serves as means that controls the accumulating amount of voids (vapor) in the water rod 19.

The fuel assembly 35 may be loaded in the reactor core 67 instead of the fuel assembly 10.

Furthermore, the recirculation pump 70 may be replaced by an internal pump that is mounted in the reactor pressure vessel 61.

The water rod 19A shown in FIG. 18A has an inverted U shape, and includes the cooling water ascending tube 40 and the cooling water descending tube 41. However, this water rod 19A is not free from the following problems.

To assemble the water rod 19A, there is a way to couple the cooling water ascending tube 20 and the cooling water descending tube 41 by welding using the coupling tube 22. When they are welded, the cooling water ascending tube 20 and the coupling tube 22 are welded from outside throughout their entire preiphery and then the cooling water descending tube 21 and the coupling tube 42 are welded from outside.

However, if the gap between the cooling water ascending tube 40 and the cooling water descending tube 41 is small, welding between the cooling water descending tube 41 and the coupling tube 42 on the cooling water ascending tube side cannot be carried out. The reason is that since the gap between the cooling water ascending tube 40 and the cooling water descending tube 41 is small, a welding torch or a welding rod cannot be inserter into this gap. Accordingly, the cooling water ascending tube 40 and the cooling water descending tube 41 must be spaced apart from each other by a gap large enough to carry out the welding work described above. However, this results in the increase in the distance between the axes at both ends of the coupling tube 42 for individually coupling the cooling water ascending tube 40 and the cooling water descending tube 41.

The fuel assembly according to still another embodiment of the present invention which solves this problem will be explained next.

The fuel assembly according to still another preferred embodiment of the present invention for the boiling-water reactor will be explained with reference to FIGS. 21 and 22.

The fuel assembly 10A of this embodiment includes the water rod 19C, the fuel rod 11, the upper the plate 12A, the lower tie plate 13A and the fuel spacer 16A. The upper and lower end portions of the fuel rod 11 are supported by the upper tie plate 12A and the Lower tie plate 13A, respectively. A plurality of fuel spacers 16A are disposed in the axial direction of the fuel assembly 10A and keep the gap between the adjacent fuel rods 11 under a suitable condition. The fuel spacer 16A is held by the water rod 19C. The channel box 17 is fitted to the upper tie plate 12A and encompasses the outer periphery of the bundle of the fuel rods 11 held by the fuel spacers 16A. The lower tie plate 13A is equipped with the fuel rod supporting portion 12A at its upper end and moreover has the space 15 thereinside below the fuel rod supporting protion 14A. The fuel rod supporting portion 12A supports the lower end portion of each of the fuel rods 11 and water rod 19C.

The water rod 19C includes a lower end plug 49, an ascending tube 46, a coupling portion 47, a descending tube 48 and an upper end plug 52. The water red 19C constituted by these components is made of a zirconium alloy.

The ascending tube 46 has a large diameter tube portion 46A, a small diameter tube portion 46B having an outside diameter smaller than that of the large diameter portion 46A and a taper portion 46C. The taper portion 46C has a through-hole 53 therein the outside is tapered. The lower end of the large diameter tube portion 46 is coupled to the upper end of the taper portion 46C by welding. The upper end of the small diameter portion 46B is coupled to the lower end of the taper portion 46C by welding. The lower end of the small diameter tube portion 46B is coupled to the lower end plug 49 by welding. The upper end of the large diameter tube portion 46A is coupled to the coupling portion 47 by welding. The descending tube 28 is disposed in parallel with the ascending tube 26, and its upper end is coupled to the coupling portion 27 by welding. The upper end plug 52 is fitted to the upper end of the coupling portion 47.

Figure 23:
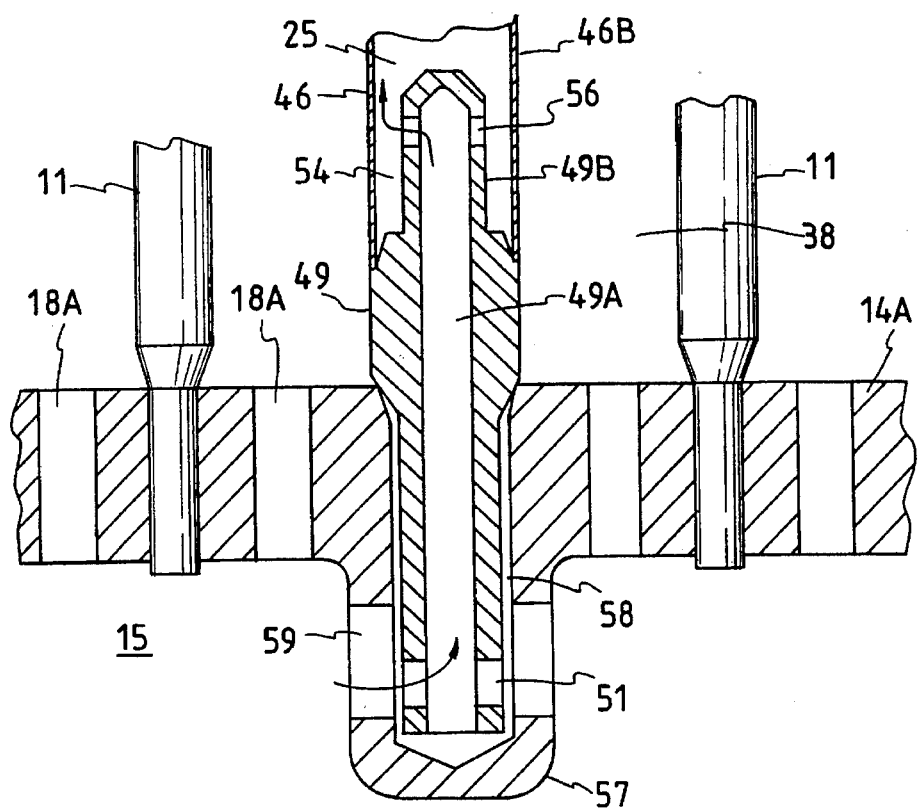
FIG. 23 is an enlarged longitudinal sectional view of a lower end plug insertion portion of the water rod at a fuel supporting portion shown in FIG. 21.

The lower end plug 49 under the condition where the water rod 19C is supported by the fuel rod supporting portion 14A is shown in magnification in FIG. 23. A path 49A is defined inside the lower end plug 49, and a coolant inlet port 51 is made in the end of the lower end plug 49. The coolant inlet port 51 is made in the side wall of the lower end plug 49 and communicates with the path 49A. The lower end plug 49 includes a projecting portion 49B the upper end of which is sealed. An opening 56 is so made on the side wall of the projecting portion 49B as to be directed sideways. The projecting portion 49B is disposed inside the small diameter tube portion 46B concentrically with the portion 46B and is positioned above the weld portion between the small diameter tube portion 46B and the lower end plug 49. Accordingly, a clad reservoir 54 is annularly formed between the small diameter portion 46B and the lower end plug 49. This clad reservoir 54 is positioned below the opening 56.

The lower end plug 49 is fitted into a hole 58 defined in a boss 57 which is disposed on the lower surface of the fuel supporting portion 14A of the lower tie plate 13A. The lower end of this hole 58 is sealed. In the side wall of the boss 57, an opening 59 directed sideways and leading to the hole 58 is made. The outer diameter of the lower end plug 49 is substantially the same as the inner diameter of the hole 58. The lower end of the path 49A extending inside the lower end plug 49 in the axial direction of the plug 49 is closed by the bottom of the boss 57. When the radiation growth of the water rod 19C due to radiation with the increase in the burnup of the fuel assembly is taken into consideration, it is preferable that the opening 59 has a margin on the higher side than the coolant inlet port 51 of the lower end plug 59 to be of greater size. Furthermore, when the possibility of the change of the positional relationship between the lower end plug 49 and the fuel supporting portion 14A from the relationship at the time of production due to combustion of the nuclear fuel, etc, is taken into consideration, it is preferable that the opening 59 has also a margin on the lower side of the coolant inlet port 51.

The cooling water ascending path 25 is defined inside the lower end plug 49 and the ascending tube 46. In other words, it includes the path 49, the opening 56, the space inside the small diameter tube portion 46B, the through-hole and the inside of the large diameter tube portion 46A. The coolant inlet port 51 is positioned below the fuel supporting portion 14A and communicates with the space 15.

The lower end of the descending tube 48 is sealed, and a delivery port 55 is formed in the side wall of the lower end portion of this tube 48. The delivery port 55 is positioned above the fuel supporting portion 14A. The cooling water descending path 26 is defined inside the descending tube 48. The delivery port 55 communicates with the descending path 26 and communicates with the coolant path 38 defined between the fuel rods 11 above the fuel supporting portion 14A.

The coupling portion 47 has a coupling portion lower part 47A and a coupling portion upper part 47B as shown in FIG. 22. The couping portion lower part 47A and coupling portion upper part 47B are coupled to each other by welding. The large diameter tube portion 46A and the descending tube 48 are welded to the coupling portion lower part 47A. The path 36 defined inside the coupling portion 47 is for communication of the cooling water ascending path 25 with the cooling water descending path 26. Accordingly, the water rod 19C has an inverted U shape as shown in FIG. 22.

Reference numeral 37A denotes a weld portion between the coupling portion lower part 47A and the ascending tube 46, 37B denotes a weld portion between the coupling portion lower part 47A and the descending tube 48, and 37C denotes a weld portion between the coupling portion lower part 47A and the coupling portion upper part 47B.

The fuel spacer 16A includes a plurality of cylindrical round cells 75 that are arranged in a square grid. The round cells 75 are mutually coupled by welding. Each round cell 75 has two rigid supporting portions 75A that protrude inward. Flexible supporting members 76 are disposed on the adjacent round cells 75. The fuel rod 11 inserted into each round cell 75 is supported at three points by the two rigid supporting portions 75A and the flexible supporting member 76.

Two water rods 19C and 19D are inserted into a region formed between the round cells 75 at the center of the fuel spacer 16A. The ascending tube 46 of the water rod 19C and the ascending tube 46a of the water rod 19D are positioned on one of the diagonals of the fuel spacer 16A and adjacent to each other. The descending tube 48 of the water rod 19C is positioned between a round cell 75E and a round cell 75F that are adjacent to the ascending tube 46. Similarly, the descending tube 48a of the water rod 19D is positioned between the two round cells adjacent to the ascending tube 46a and adjacent to each other. Since the descending tubes 48 and 48a are disposed between the adjacent round cells, the outside diameter of the large diameter tube portion 46A of each of the water rods 19C and 19D can be increased within such a range that seven fuel rods 11 can be disposed. This results in the increase in the transverse sectional area of the coolant ascending path 13 inside the large diameter tube portion 46A. The descending tubes 48 and 48a are positioned in mutually opposite directions in the direction of the other diagonal of the fuel spacer 16A perpendicularly crossing the diagonal described above on which the ascending tubes 46 and 46a are positioned.

The ascending tube 46 is supported at three points by the rigid supporting members 27A and 27B fitted to a plurality of round cells 25 opposing to the ascending tube 46 or 46a and by the flexible supporting member 78A disposed on a bridging member fitted to the adjacent round cells 75. The ascending tube 46a is supported at three points by the rigid supporting members 27A and 27B and a flexible supporting member 78B disposed on a bridging member fitted to the adjacent round cells 75. The ascending tubes 46 and 46a supported in this manner is not in contact with each other.

The descending tube 48 (having an outside diameter of about 5 mm) is supported at the large diameter tube portion 46A of the ascending tube 46 by supporting members (for example, the supporting member 45 shown in FIG. 18A), not shown in the drawings. A narrow gap is defined between the descending tube 48 and the large diameter tube portion 46A. The descending tube 48a is supported similarly by the large diameter portion 46A of the ascending tube 46a.

The cross-sectional area of the cooling water descending path 26 inside the water rod 19C and the descending tube 19D is smaller than 1/25 of the cross-sectional area of the cooling water ascending path 25 (at the large diameter tube portion 46A) inside the ascending tube. Therefore, the fuel assembly 10A can have the characteristics shown by the solid line in FIG. 6 and by the single dot and dash line in FIG. 7 of U.S. Pat. No. 5,023,047. When the fuel assemblies 10A are loaded in the core, the boiling-water reactor can operate as shown in FIG. 15 of U.S. Pat. No. 5,023,047 by regulating the flow rate of cooling water supplied to the core.

When the quantity of the cooling water supplied into the fuel assembly 10A having the water rods 19C and 19D each equipped thereinside with the cooling water ascending path 25 and the cooling water descending path 26 is changed, the flow condition of the fluid inside the water rods 19C and 19D changes as shown in FIGS. 3A, 3B and 3C.

In other words, the fuel assembly 10A is loaded in the core of the boiling-water reactor. The flow rate of the cooling water supplied to the core is regulated by controlling the number of revolutions of a recirculation pump, not shown in the drawing. The cooling water is first guided to the space 15 of the lower tie plate 13A. The major proportion of this cooling water passes through the through-hole 18A bored in the fuel supporting portion 14A, flow into the coolant path 38 above the upper surface of the fuel supporting portion 14A and cool the fuel rod 11. Part of the rest cooling water flows into the coolant ascending path 25 of the water rod 19C through the opening 59 and the coolant inlet port 51. This also holds true for the water rod 19D.

The flow of the fluid inside the cooling water ascending path 25 will be explained. The cooling water guided to the path 49A as a part of the cooling water ascending path 25 reaches the large diameter tube portion 46A through the opening 56, the small diameter tube portion 46B and the taper portion 46C. When the flow rate of the cooling water supplied into the fuel assembly 10A is low, the cooling water existing inside the cooling water ascending path 25, particulary in the large diameter tube portion 46A, is heated by radiation of gamma rays generated from nuclear fission of the nuclear fuel. When the flow rate of cooling water supplied into the fuel assembly 10A is low, the cooling water turns to vapor, and a vapor region is formed inside the cooling water ascending path 25 as shown in FIG. 3A. Consequently, a liquid surface is formed inside the cooling water ascending path 25. The generated vapor is discharged from the coolant delivery port 55 into the cooling water path 38 throuhg the path 36 and cooling water descending path 26. As the flow rate of cooling water increases, the liquid level inside the cooling water ascending path 25 rises and the vapor region decreases. Through the condition shown in FIG. 3C, that is, the condition where the cooling water ascending path 25 and the cooling water descending path 26 are fully filled with cooling water, is finally established. Accordingly, since the change of the voidity inside the fuel assembly 10A can be enlarged between the initial stage and the final stage of the fuel cycle in this way, the effect of the spectrum shift can be increased and the period of one fuel cycle can be drastically lengthened. It is around the final stage of the fuel cycle when the insides of the cooling water ascending path 25 and the cooling water descending path 26 are fully filled with cooling water, and the vapor region is formed inside the cooling water ascending path 25 through the major proportion of the fuel cycle. Accordingly, when the cooling water descending path is so disposed as to encompass the cooling water ascending path as shown in FIG. 7A, the tube wall disposed between the cooling water ascending path and the cooling water descending path comes into contact with the vapor and its temperature becomes high because cooling is not sufficient. In this embodiment, the ascending tube 46 and the descending tube 48 are so arranged as to define the inverted U shape and moreover, the gap exists between these ascending and descending tubes 46, 48 as already described. Accordingly, the peripheries of both of the ascending and descending tubes 46, 48 are cooled by cooling water ascending in the cooling water path 38. Therefore, the temperatures of the ascending tube 46 and the descending tube 48 drop and the problem involved in the water rod and shown in FIG. 7A can be solved.

The reason why the condition where the liquid surface is formed inside the water rod 19C shifts to the condition where the liquid surface is not formed by the regulation of the flow rate of cooling water supplied into the fuel assembly 10A is that the fuel supporting portion 14A functions as a resistance to the cooling water path 38 and the total cross-sectional-area of all the through-holes 18A provided in the fuel supporting portion 14A is so determined that the liquid surface can be moved. In other words, the total cress-sectional area of all the through-holes 18A is so determined as to correspond to the static head corresponding to the difference between the level at the upper end of the cooling water ascending path 25 and the level of the coolant delivery port 55. The total cross-sectional area of all the through-holes 18A made in the fuel supporting portion 14A is smaller than the cross-sectional area of the cooling water path 38. The fuel supporting portion 14A having such a construction serves as the resistance to the cooling water path As described above, the cross-sectional area of the cooling water ascending path 25 inside the large diameter tube portion 46A can be increased by disposing the descending tubes 48 and 48a between the adjacent round cells 75. Accordingly, when the vapor region is formed inside the large diameter tube portion 46A, the quantity of plutonium produced increases so much more, and when the insides of the cooling water ascending path 25 and the cooling water descending path 26 are filled with the cooling water (moderator) near the end of the fuel cycle, nuclear fission of plutonium and other fission substances can be activated. Accordingly, the reactivity at the center of the cross-section of the fuel assembly 10A can be much more improved and effective utilization of the nuclear fuel can be accomplished. In other words, the effect of the improvement in fuel economy due to the spectrum shift can be further improved. The descending tubes 48 and 48a are positioned in the mutually opposite directions on the other diagonal crossing perpendicularly the diagonal on which the ascending tubes 46 and 46a are positioned. Therefore, even when the descending tubes 48 and 48a are filled with the vapor, the vapor region does not locally concentrate on the cross-section of the fuel assembly, and the fuel assemblies can be disposed in a good balance. In this way, uneven burnup of the nuclear fuel on the cross-section of the fuel assembly can be prevented.

Figure 7A:
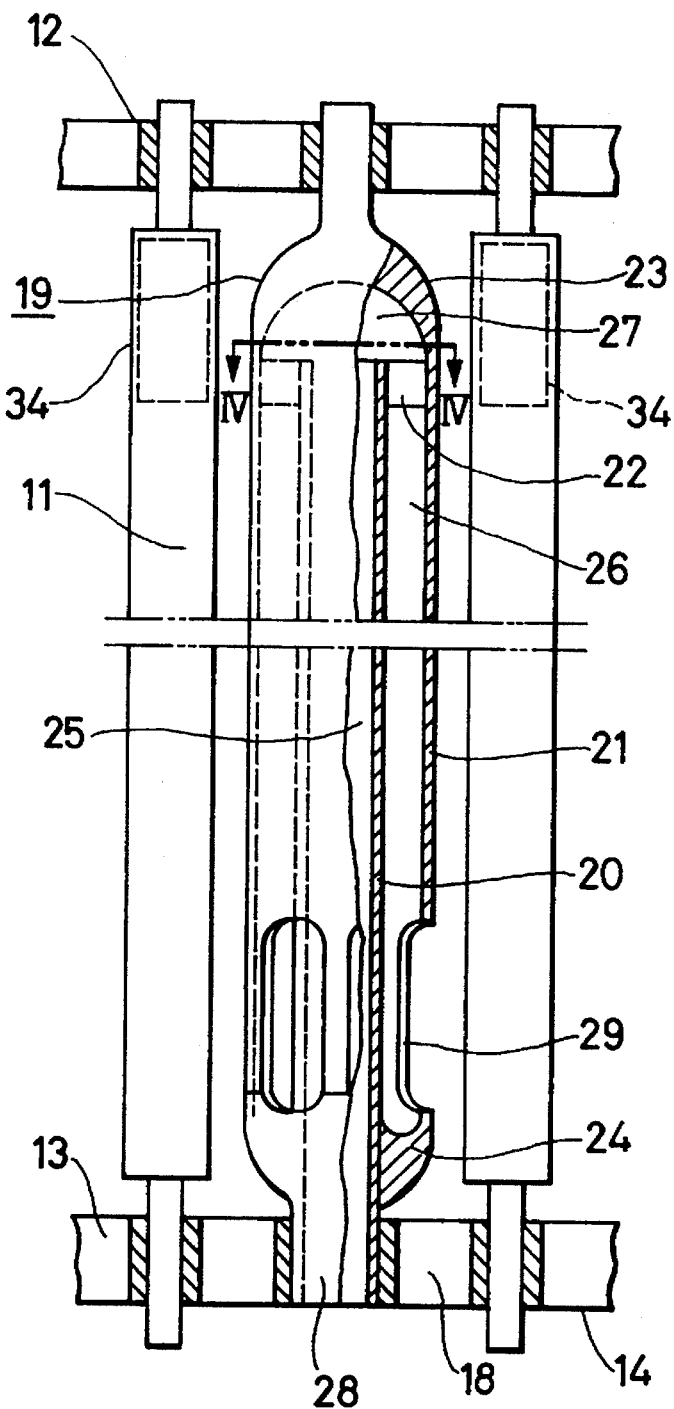
FIG. 7A is a local vertical section view of the water rod of FIG. 4.
Figure 7B:
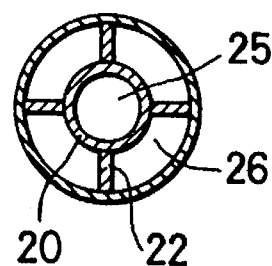
FIG. 7B is a section view along a line IV—IV of FIG. 7A.

In the water rod shown in FIG. 7A, one coolant inlet port is disposed at the lower end of the cooling water ascending path. For this reason, there is the possibility that the coolant inlet port is clogged by solid matters such as clads that flow with the coolant. The smaller the diameter of the coolant inlet port, the higher becomes this possibility. In this embodiment, the cooling water inlet port 51 is so disposed as to be perpendicular to the axial direction of the cooling water ascending path, and a plurality of such inlet parts 51 are disposed in the circumferential direction of the lower end plug 49. Accordingly, cooling water flowing into the cooling water inlet ports 51 must turn at right angles immediately before the ports 51, and the possibility of clogging of the cooling water inlet port 51 by the clad, etc. is by far smaller than the possibility in the water rod shown in FIG. 7A. Furthermore, since the cooling water inlet port 51 is not disposed in the axial direction of the lower end plug 49, there is no opening in the flowing direction of the core coolant when the lower end is closed. Therefore, the influence of the dynamic pressure due to the flow can be suppressed, and variation of the liquid level inside the water rod due to variation of the dynamic pressure can be remarkably suppressed.

As described above, the vapor region is formed inside the cooling water ascending path 25 in the major portion of the fuel cycle, cooling water existing inside the cooling water ascending path 25 is considered to concentrate. Therefore, the clads contained in cooling water may aggregate and settle. The opening 56 is transversely disposed lest it is clogged by the settling clads, and is positioned above the bottom surface of the path formed inside the small diameter tube portion 46B. The settling clads are gradually deposited inside the clad reservoir 54 formed between the small diameter portion and the projecting portion 49B. The capacity of the clad reservoir 54 is determined by estimating the quantity of the clads deposited during the life of the fuel assembly 10A.

Next, the assembling process of the ascending tube 46, the coupling portion 47 and the descending tube 48 in this embodiment will be explained with reference to FIGS. 26A to 26D. The lower portion 47A of the coupling portion 47 has through-holes 47E and 47F as shown in FIGS. 26A to 26D, and is lower than the upper end of the lower portion 47A of the coupling portion at which the upper end of the side wall between the through-holes 47E and 47F is formed. The inside diameter of the through-hole 47E is greater than that of the through-hole 47F. FIG. 26D is a sectional view taken along line X—X of FIG. 26C.

Figure 26A:
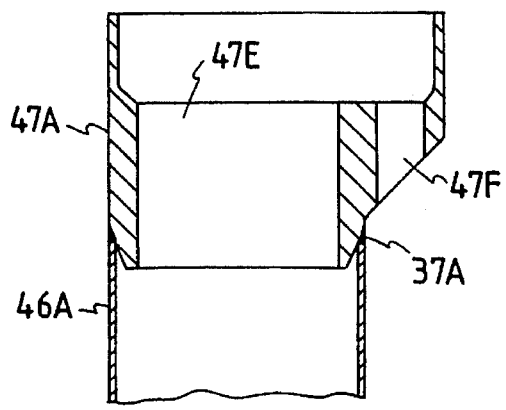
FIG. 26A is an explanatory view showing the state where the lower part of the coupling portion and a large diameter tube portion are connected by welding.
Figure 26B:
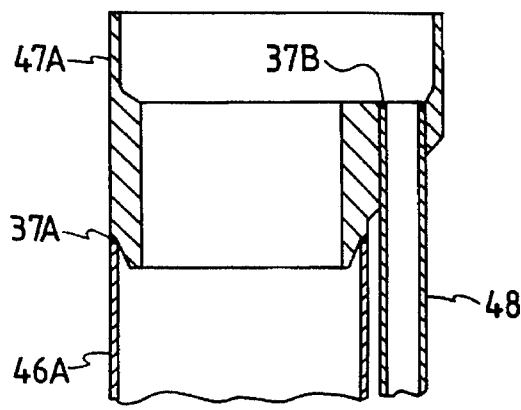
FIG. 26B is an explanatory view showing the state where the lower part of the coupling portion and a descending tube are connected by welding.
Figure 26C:
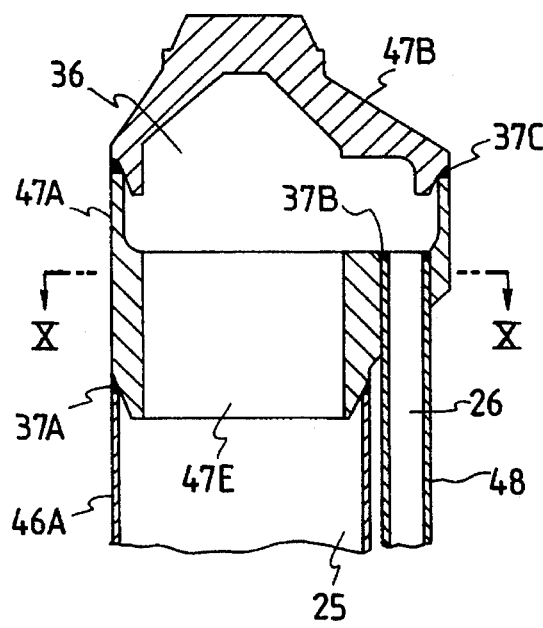
FIG. 26C is an explanatory view showing the state where the upper part of the coupling portion is connected to the lower part of the coupling portion.
Figure 26D:
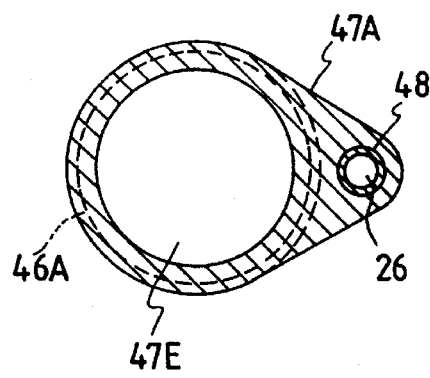
FIG. 26D is a sectional view taken along line X—X of FIG. 26C.

First of all, the ascending tube 46, that is, the upper end portion of the large diameter tube portion 46A, is fitted to the lower end portion of the side wall encompassing the through-hole 47E of the lower portion 47A of the coupling portion having such a construction by welding over the whole periphery of the large diameter tube portion 46A (FIG. 26A). The lower portion 47A of the coupling portion and the large diameter tube portion 46A are coupled through the weld portion 37A. Thereafter, the upper end portion of the descending tube 48 is fitted into the through-hole 47F of the lower portion 47A of the coupling portion, and the side wall encompassing the through-hole 47F of the lower portion 47A of the coupling portion and the whole periphery of the upper end portion of the descending tube 48 are coupled by welding from above (FIG. 26B). The lower portion 47A of the coupling portion and the descending tube 48 are coupled through the weld portion 37B. The lower portion 47A of the coupling portion is a coupling member for coupling the ascending tube 46 and the descending tube 48 at their upper ends. Finally, the upper portion 47B of the coupling portion is provided on the lower portion 47A of the coupling portion in such a manner as to cover the through-hole 47E of the lower portion 47A of the coupling portion and the cooling water descending path 26 inside the descending tube 48. Under such a condition, the upper end of the lower portion 47A of the coupling portion is fitted to the upper portion 47B of the coupling portion over the whole periphery by welding (FIG. 26C). The lower portion 47A of the coupling portion is integrated with the upper portion 47B of the coupling portion through the weld portion 37C. The upper portion 47B of the coupling portion is a cover member for covering the cooling water ascending path 25 and the cooling water descending path 26 from above. The upper end plug 52 is fitted to the upper portion 47B of the coupling portion by welding.

Figure 24:
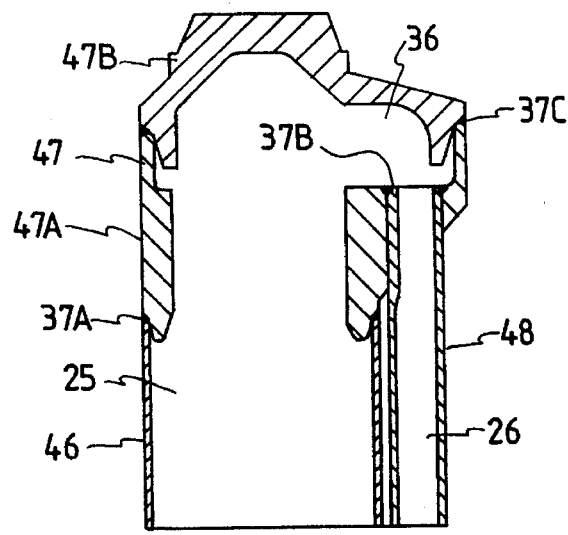
FIG. 24 is an enlarged longitudinal sectional view of a portion near the coupling portion of the water rods shown in FIG. 22.
Figure 25:
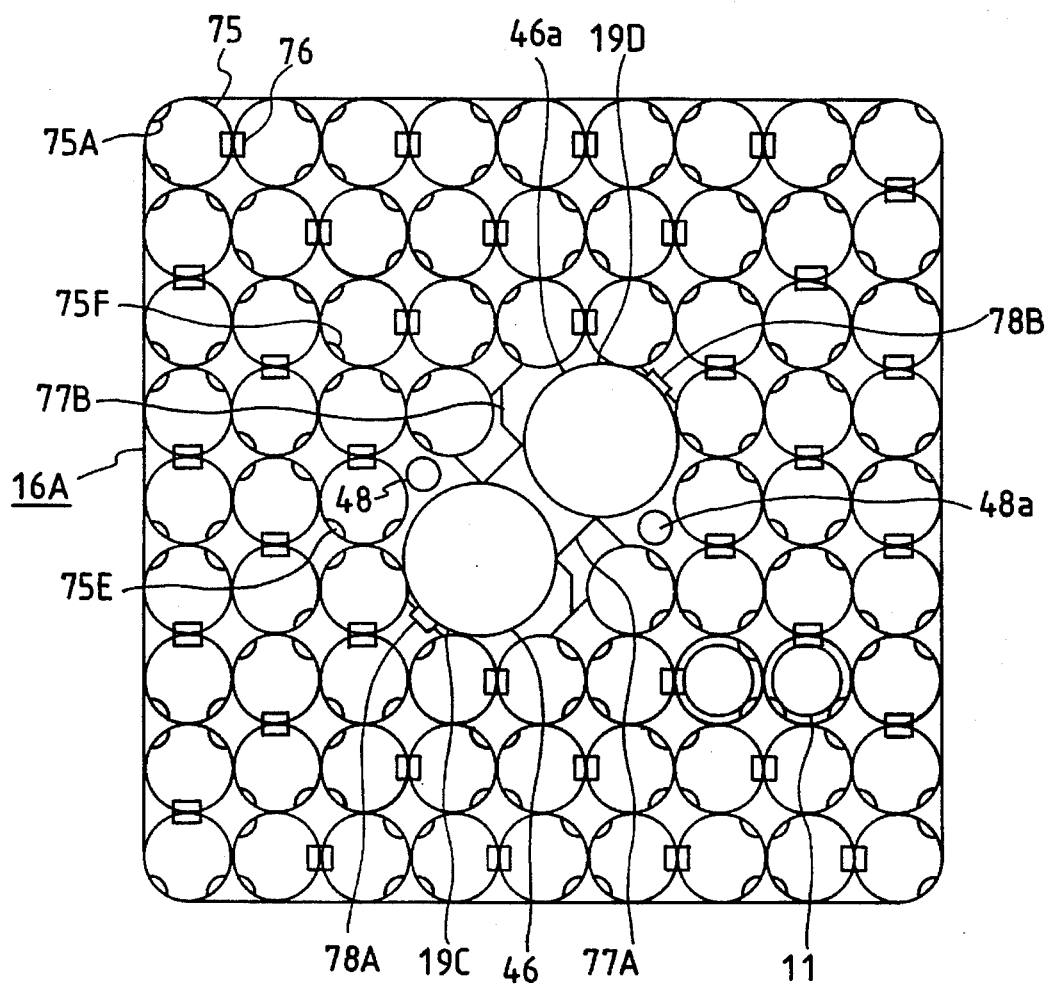
FIG. 25 is a plan view of the fuel spacer shown in FIG. 21.

As described above, in the water rod 19C used in this embodiment, the descending tube 48 is fitted into the through-hole 47F and the upper end of the descending tube 48 is fitted to the lower portion 47A of the coupling portion through the weld portion 37C. Accordingly, the whole periphery of the descending tube 48 can be easily welded to the lower portion 47A of the coupling portion. Even when the ascending tube 46 is thin, particularly the gap formed between the large diameter tube portion 46A and the descending tube 48 is thin, the whole periphery of the descending tube 48 can be easily welded to the lower portion 47A of the coupling portion. The descending tube 48 is disposed as shown in FIG. 25, and the width of the gap defined between the descending tube 48 and the large diameter tube portion 46A cannot be much increased. If the width of this gap is increased, the outside diameter of the large diameter tube portion 46A must be reduced. Since this results in the decrease in the cross-sectional area of the cooling water ascending path 25 inside the large diameter tube portion 46A, the effect of the aforementioned spectrum shift is weakened and the degree of improvement in fuel economy drops. In FIG. 25, the descending tubes 48 and 48a cannot be moved further deeply into the gap defined between the round cells 75 from the positions described above because support structural members (not shown) for supporting the descending tubes 48 and 48a on the corresponding large diameter tube portions 46A strike the adjacent round cells 75. By the weld structure of the large diameter tube portion 46A, the descending tube 48 and the lower portion 47A of the coupling portion which is obtained by the assembly method of FIGS. 26A to 26D and is shown in FIG. 24, the width of the gap between the large diameter tube portion 46A and the descending tube 48 can be reduced and the outsider diameter of the large diameter tube portion 46A can be increased. Accordingly, the cross-sectional area of the cooling water ascending path 25 can be increased, and the degree of improvement in fuel economy due to the spectrum shift effect can be increased so much more.

Incidentally, since the water rod 19C receives external force through the fuel spacer 16A during earthquake, etc, a bending moment is produced in the water rod 19C. In this embodiment, the structural strength of the water rod 19C is governed by the large diameter tube portion 46A. Accordingly, from the aspect of soundness of the water rod structure, the welding between the large diameter tube portion 46A and the lower portion 47A of the coupling portion is preferably of an ordinary type. Further, the size of the lower portion 47A of the coupling portion can be reduced much more greatly by welding the large diameter tube portion 46A to the lower portion 47A of the coupling portion in the state that the lower end of the lower portion 47A of the coupling portion is inserted into the upper end of the large diameter tube portion 46A as shown in FIG. 26C than by welding contrarily the large diameter tube portion 46A to the lower portion 47A of the coupling portion in the state that the lower portion 47A of the coupling portion encompasses the outside of the large diameter tube portion 46A. This welding is preferable from the aspect of the reduction of the size of the coupling portion 4, too.

In the water rods 19C and 19D used in this embodiment, the lower end plug 49 having a smaller outside diameter than that of the large diameter tube portion 46A and the small diameter tube portion 46B are arranged above the upper surface of the lower tie plate 13A (the upper surface of the fuel supporting portion 14A). Therefore, the outside diameter of the ascending tube 46 near the lower end portion, that is, at the portion which is lower than the fuel spacer 16A at the lowermost level is reduced. The portion having this reduced outside diameter has a length of about 3 to 4% of the full length of the water rods 19C, 19D in the axial direction. Even when the bending stress acts on the ascending tube 46 of each water rod 19C, 19D during an earthquake, etc, excessive stress at the lower end of the ascending tube 46 can be prevented by reducing the outside diameter of the ascending tube 46 of each water rod 19C, 19D over the range of 3 to 4% of the full length of the water rod 19C, 19D in the axial direction upward from the upper surface of the lower tie plate 13A.

Besides the assembly method of the ascending tube 46, the coupling portion 47 and the descending tube 48 described above, the ascending tube 46 and the descending tube 48 can be easily welded to the lower portion 47A of the coupling portion over the whole periphery by the following method even when the gap defined between the large diameter portion 46A and the descending tube 48 is small.

In this assembly method, the inside diameter of the through-hole 47E of the lower portion 47A of the coupling portion is equal to the outside diameter of the large diameter tube portion 46A of the ascending tube, 46, the large diameter tube portion 46A is inserted into the through-hole 47E, and the upper end of the large diameter tube portion 46A is welded to the lower portion 47A of the coupling portion. The descending tube 48 is welded to the side wall on the lower surface side of the lower portion 47A of the coupling portion under the state where a part of the side wall encompassing the through-hole 47F is inserted into the descending tube as shown in FIG. 26A. The upper end of the lower portion 47A of the coupling portion is welded to the upper portion 47B of the coupling portion over the whole periphery as shown in FIG. 26C. By this second method, the coupling portion 47 is large and the pressure loss of the fuel assembly increases in comparison with the assembly method shown in FIGS. 26A to 26D. The reason is that since the large diameter tube portion 46A is inserted into the through-hole 47E, the side wall encompassing the through-hole 47E becomes necessary. The inside diameter of the through-hole 47F becomes smaller than that of the descending tube 48.

In the assembly method shown in FIGS. 26A to 26D and in the method described above, the weld portions of the large diameter tube portion 46A and the descending tube 48 to the lower portion 47A of the coupling portion are shifted from each other in the axial direction. Accordingly, welding of one of them does not adversely affect welding of the other, and does not either hinder the insertion of the tube used for the other welding into the corresponding through-hole (into the lower portion 47A of the coupling portion).

Figure 27:
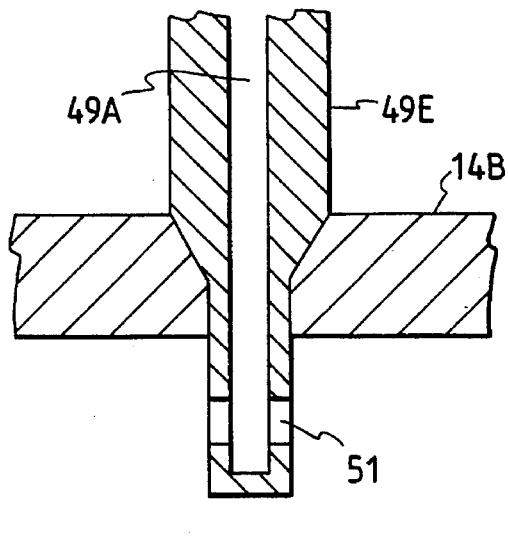
FIG. 27 is a longitudinal sectional view of another embodiment of the lower end plug of the water rod.

Another embodiment of the lower end plug of the water rod used in the embodiment described above is shown in FIG. 27. This lower end plug 49E is the one in which the lower end of the lower end plug 49 is closed. In other words, the lower end of the passage 49A is closed. The upper structure of the lower end plug 49E, not shown in the drawing, is the same as that of the lower end plug 49. The lower end plug 49E has the same effect as that of the lower end plug 49. Further, by the use of this lower end plug 49E, the boss 57 is not necessary for the fuel supporting portion 14B, and the structure of the lower tie plate 13A can be simplified.

Figure 28:
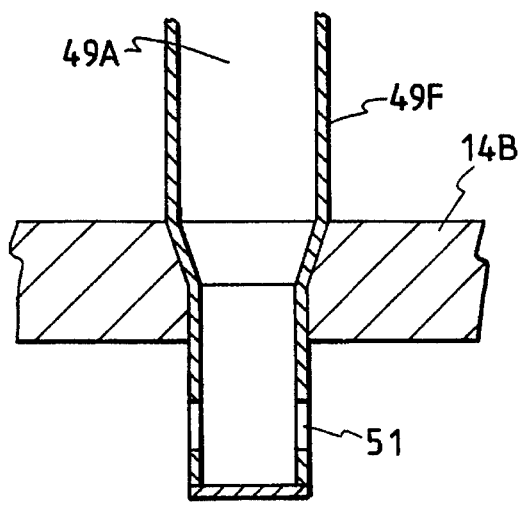
FIG. 28 is a longitudinal sectional view of another embodiment of the lower end plug of the water rod.

It is also possible to use a lower end plug 49F shown in FIG. 28 which is produced by swaging the lower end plug 49 described above. In this case, a round plate member for closing the passage 49 is fitted to the lower end of the lower end plug 49F. The projecting portion 49B formed on the lower end plug 49 is fitted to the upper part of the lower end plug 49F. This lower end plug 49, too, can has the same effect as that of the lower end plug 49F.

Figure 29:
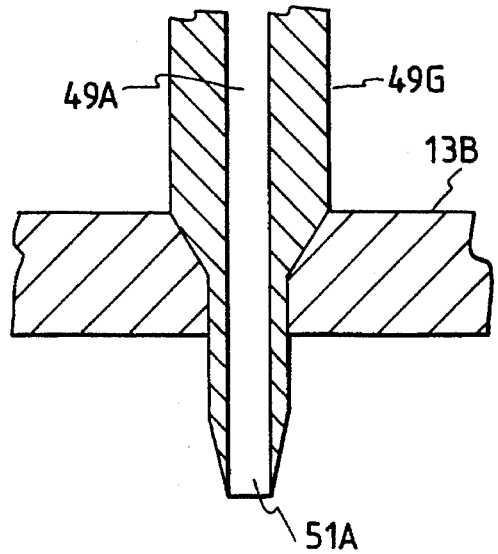
FIG. 29 is a longitudinal sectional view of still another embodiment of the lower end plug of the water rod.

FIG. 29 shows still another embodiment of the lower end plug. The lower end plug 49 of this embodiment has an opening 51A of the passage 49A. The upper structure of the lower end plug 49G is the same as that of the lower end plug 49. The lower end plug 49G has a tapered part outside the side wall encompassing the passage 49A. The formation of this taper can prevent clogging of the opening 51A by solid matters such as the clads flowing with the cooling water. However, since the opening 51A is directed in the flowing direction of cooling water, the effect of reducing the influence of the dynamic pressure is low like the opening 51 of the lower end plug 49.

Figure 30:
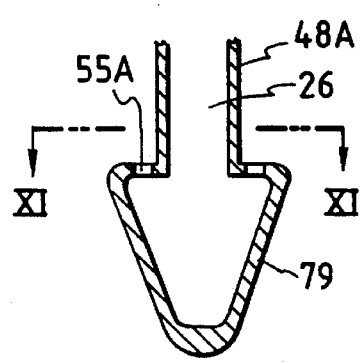
FIG. 30 is a longitudinal sectional view of another structure of a portion at and near the lower end of the descending tube of the water rod.

Another embodiment of the structure at and near the delivery port 55 of the descending tube 48 is shown in FIG. 30. In the embodiment shown in FIG. 21, the delivery port 55 is formed in the side surface of the descending tube 48 so as to suppress the influences of the dynamic pressure due to cooling water flowing outside the water rods. However, from the aspect of the suppression of the influences of the dynamic pressure due to the flow of cooling water, it is preferable to form a plurality of openings 55A in the upper surface of the header 79 in which the lower end portion of the descending tube 48A is enlarged like an inverted corn.

The cooling water or the vapor descending inside the cooling water descending passage 26 flows out through the openings 55A in the flowing direction of cooling water inside the cooling water path 38. Since the delivery direction of the fluid through the openings 55A and the flowing direction of the cooling water inside the cooling water path 38 become substantially the same, discharge of the fluid through the openings 55A becomes smooth.

Figure 31:
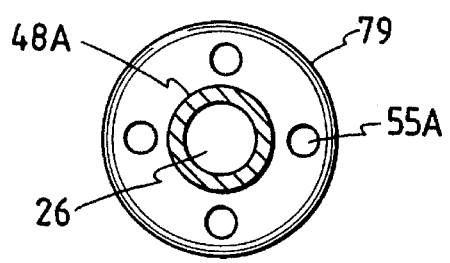
FIG. 31 is a sectional view taken along line XI—XI of FIG. 30.
Figure 32:
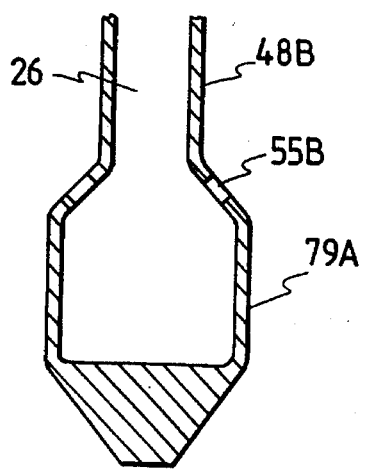
FIG. 32 is a longitudinal sectional view of another structure of a portion at and near the lower end of the descending tube of the water rod.

FIG. 32 shows another example of the structure at and near the delivery port of the descending tube 48B shown in FIG. 30. This structure includes the header 79A having a slant inclining outward from the descending tube 48B on the upper surface thereof, at the lower end portion of the descending tube 48B. Four openings 55B are made on the upper slant of the header 79A in the same way as in FIG. 31.

Figure 33:
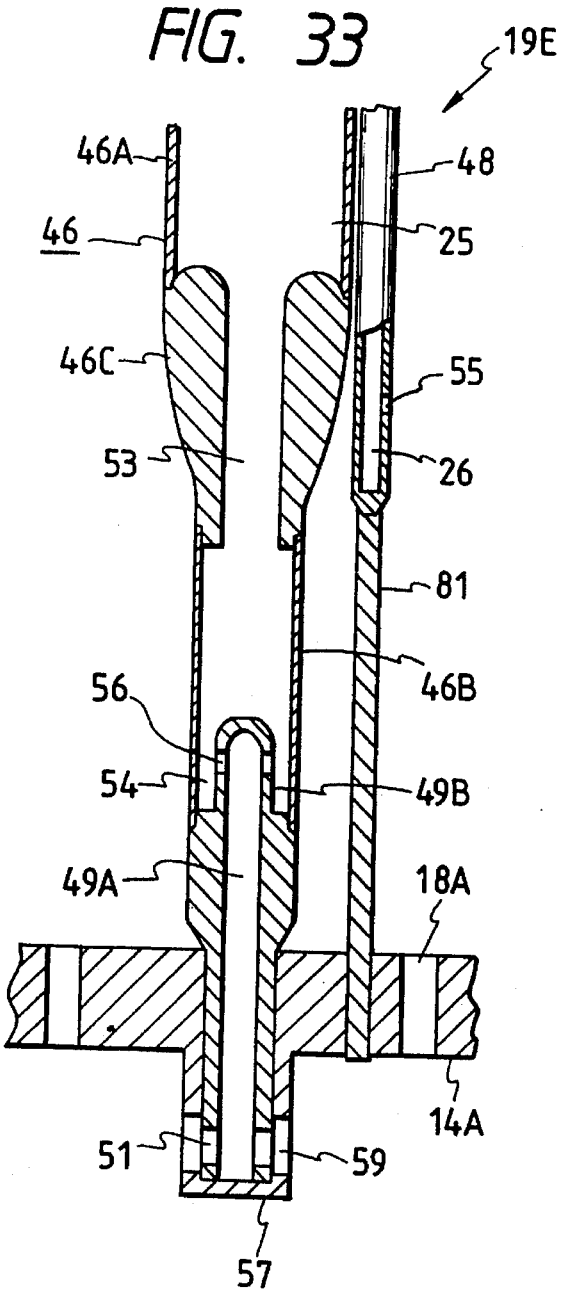
FIG. 33 is a longitudinal sectional view of a portion at and near the lower end in still another embodiment to the water rod.

A water rod 19E as another embodiment of the water rod 19C shown in FIG. 22 is shows in FIG. 33. This water rod 19E includes a supporting portion 81 extending downward at the lower end of the descending tube 48. This supporting portion 81 is inserted into the fuel supporting portion 14A of the lower tie plate 13A. According to such a structure, the supporting force of the descending tube 48 can be increased, and the possibility of flow vibration of the descending tube 48 due to the flow of cooling water flowing inside the cooling water descending tube 38 can be reduced. Since the radiation growth quantity of the fuel rod 11 due to the radiation is greater than that of the water rod 19E, the water rod 19E moves upward through the fuel spacer 16A depending on the difference of the radiation growth quantity between the water rod 19E and the fuel rod 11. The lower end plug 49 of the ascending tube 46 has a sufficient length such that it does not come off the fuel supporting portion 14A due to the upward movement described above.

What is claimed is:

1. A method of fabricating a water rod including an ascending tube path having therein a coolant ascending path for guiding upward a coolant supplied, and a descending tube path disposed outside said ascending tube path and having therein a coolant descending tube path for guiding downward said coolant guided by said coolant ascending tube path and discharging said coolant to a region above fuel supporting portions, characterized in that either one of said ascending tube path and said descending tube path is inserted into a coupling member, the upper end of said one tube path is welded to said coupling member, the other of said tube paths is welded to the lower part of said coupling member, and a cover member forming a communication path, for communication of said coolant ascending tube path with said coolant descending tube path, between said cover member and said coupling member is attached to said coupling member.

* * * * *